(12) United States Patent
Bloom

(10) Patent No.: US 8,114,179 B2
(45) Date of Patent: Feb. 14, 2012

(54) DEVICE AND METHOD FOR PARTICLE SEPARATION

(75) Inventor: Michael R. Bloom, Kasota, MN (US)

(73) Assignee: Tenoroc, LLC, Orlando, FL (US)

( * ) Notice: Subject to any disclaimer, the term of this patent is extended or adjusted under 35 U.S.C. 154(b) by 1029 days.

(21) Appl. No.: 11/960,684

(22) Filed: Dec. 19, 2007

(65) Prior Publication Data

US 2011/0120303 A1    May 26, 2011

Related U.S. Application Data

(60) Provisional application No. 60/870,767, filed on Dec. 19, 2006.

(51) Int. Cl.
*B01D 45/12* (2006.01)
(52) U.S. Cl. ............................................. 55/315; 55/400
(58) Field of Classification Search ............. 55/400, 55/403, 404, 406, 315; 95/270
See application file for complete search history.

(56) References Cited

U.S. PATENT DOCUMENTS

| | | | |
|---|---|---|---|
| 3,251,542 | A | 5/1966 | Newgard et al. |
| 3,465,500 | A | 9/1969 | Fenn |
| 3,626,665 | A | 12/1971 | Fenn et al. |
| 4,235,612 | A | 11/1980 | Gazda |
| 4,863,491 | A | 9/1989 | Brandt et al. |
| 5,902,224 | A | 5/1999 | Bloom |
| 6,372,019 | B1 | 4/2002 | Alferov et al. |
| 6,821,319 | B1 | 11/2004 | Moberg et al. |
| 7,591,882 | B2 * | 9/2009 | Harazim .................. 95/270 |

OTHER PUBLICATIONS

Kantrowitz, A., et al., "Preliminary Investigation of Supersonic Diffusers", NACA, Wartime Report L5D20, May 1945.
Reis, V., et al, "Separation of Gas Mixtures in Supersonic Jets", Journal Chem. Phys., vol. 39, No. 12, pp. 3240-3250, Dec. 1963.
Soubbaramayer, "Centrifugation", Uranium Enrichment, vol. 35, pp. 183-244, 1979.
Becker, E.W., "Separation Nozzle," from Topics in Applied Physics: Uranium Enrichment, New York: Springer-Verlag Berlin Heidelberg, 1979.
Campargue, R., "Progress in Overexpanded Supersonic Jets and Skimmed Molecular Beams in Free-Jet Zones of Silence", J. Phys. Chem. 88, pp. 4466-4414, 1984.
Amberg, G., et al., "Boundary Layers in a Sectioned Centrifuge", J. Fluid Mech., vol. 181, pp. 77-97, 1987.

(Continued)

*Primary Examiner* — Robert A Hopkins
(74) *Attorney, Agent, or Firm* — Thompson Hine LLP

(57) ABSTRACT

A separation device with a gas inlet port that accepts an inlet gas. The inlet gas is composed of a mixture of at least two separable particle components with each component having a different mass. A rotating separation rotor accepts the inlet gas and uses a separator to substantially separate the gas according to mass into two fractions, a heavier and a lighter fraction. One of the fractions is passed to a second separator that further separates that fraction into another two fractions consisting of heavier and lighter fractions. The desired fractions are collected and exhausted from the separation device for use.

24 Claims, 22 Drawing Sheets

OTHER PUBLICATIONS

Kai, T., et al., "Numerical Calculation of Flow and Isotope Separation for SF6 Gas Centrifuge", Journal of Nuclear Science and Tech, vol. 37, No. 2, pp. 153-165, Feb. 2000.

Kelleners, P., "Simulation of Inviscid Compressible Multi-Phase Flow with Condensation", Center for Turbulence Research, Annual Research Briefs, 2003.

Li, S., Thesis: "Design, Fabrication and Testing of Micronozzles for Gas Sensing Applications", Electrical & Computer Engineering Theses and Dissertations, University of Maryland, Apr. 3, 2006.

Wood, III, H.G., "Analysis of Feed Effects on a Single-Stage Gas Centrifuge Cascade", Separation Science and Technology, 30(13) pp. 2631-2657, 1995.

Hsu, H.W., "Separations by Centrifugal Phenomena", Techniques of Chemistry, vol. XVI, 1981.

Wood, H.G., et al., "Multi-Isotope Separation in a Gas Centrifuge Using Onsager's Pancake Model", Separation Science and Technology 31(19), pp. 1185-1213, 1996.

Erbland, P.J., et al., "Numerical and Experimental Investigation of CO2 Condensate Behavior in Hypersonic Flow", AIAA Aerodynamic Measurement Technology & Ground Testing Conference, Denver, CO, Jun. 19-22, 2000.

Wood, H.G., et al., "On a Criterion Efficiency for Multi-Isotope Mixtures Separation", Separation Science and Technology, 34(3), pp. 343-357, 1999.

Ying, C., et al., "Solution of the Diffusion Equations in a Gas Centrifuge for Separation of Multicomponent Mixtures", Separation Science and Technology 31(18), pp. 2455-2471, 1996.

International Search Report and Written Opinion, Corresponding application PCT/US2007/088251, mailed Jul. 2, 2009.

European Search Opinion dated Apr. 8, 2011, issued in European Patent Application No. 07869586.3.

Supplementary European Search Report dated Apr. 1, 2011, issued in European Patent Application No. 07869586.3.

\* cited by examiner

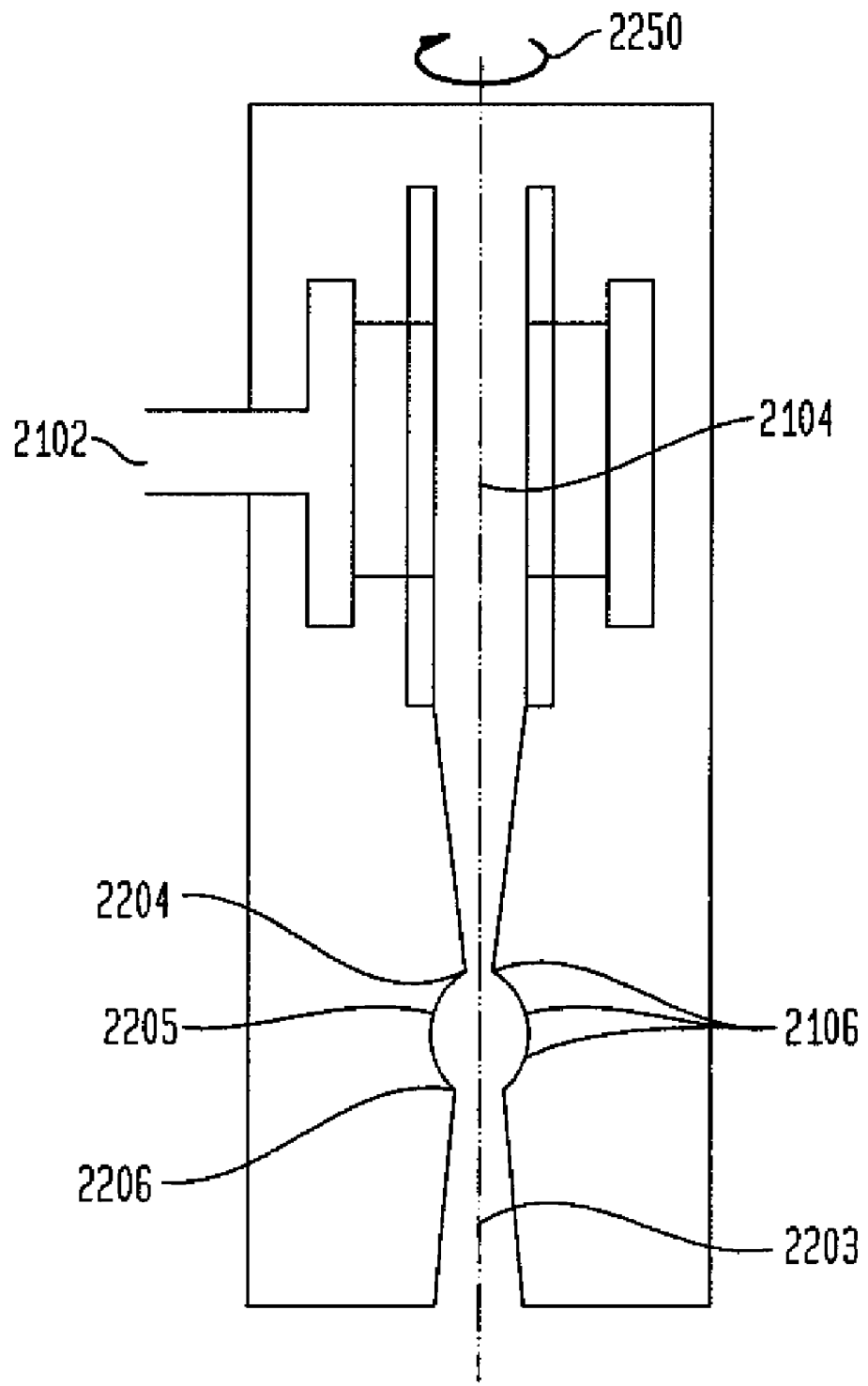

DEVICE AND METHOD FOR PARTICLE SEPARATION

CROSS-REFERENCE TO RELATED APPLICATIONS

This application claims the benefit of U.S. Application No. 60/870,767, filed Dec. 19, 2006.

BACKGROUND OF THE INVENTION

1. Technical Field

The present invention relates to a gas specie and aerosolized-gas mixture particle separation device and process, more generally described as a separation device to separate a gas mixture, or a gas with aerosolized mixture into its heavy and light components by mass differences through a combination of supersonic expansion, core flow collimation, and differential diffusion from a pressure gradient in a centrifugal field.

2. Background Art

Key energy and chemical industries currently require advanced gas separation technologies to be developed so that efficient production of critical products can be realized. Whereas accepted separation technology is now used or is available, capital or energy expense is prohibitive so that acceptable production is not viable. Generally the requirements of these industries is for high volume, possibly with high pressure and elevated temperature processing of mixed gas flows to extract contaminants to yield a purified product gas.

It has been known for many years that gas centrifugation may be used to separate two-component gas mixtures, particularly for uranium isotope enrichment. In this application, a gas mixture is fed into a complex rotor assembly that spins at high speed inside of an evacuated casing. Because the rotor spins extremely rapidly, centrifugal force results in the gas occupying only a thin layer next to the rotor wall, with the gas moving at approximately the speed of the rotor wall. The centrifugal force has a property similar to gravity in that it accelerates molecules or particles at a rate which is independent of their masses. It follows that centrifugal force by itself cannot be used to separate molecular species. All it can do is create a pressure variation in the gas, against which molecules or particles of different masses diffuse at different rates. It is this differential diffusion against a pressure gradient that underlies the centrifuge method. The separation factor is solely the difference of the molecular weights ($\Delta M$) between species in the gas mixture, allowing diffusion concentration of heavy components along the moving wall and the light component separation diffusion away from the moving wall.

The use of the centrifuge method for isotope separation was first suggested in 1919, but efforts in this direction were unsuccessful until 1934, when J. W. Beams and co-workers at the University of Virginia applied a vacuum ultracentrifuge to the separation of chlorine isotopes. Although the U.S. abandoned the centrifuge method during the Manhattan Project, the gas centrifuge uranium enrichment process has been fully developed by others and is used to produce high-enriched uranium (HEU) and low-enriched uranium (LEU). These classical centrifuge designs are now used in variety of different separation processes.

The main subsystems of these classical centrifuge methods are: (1) rotor and end caps, (2) top and bottom bearing system, (3) electric motor and frequency controller, (4) center post, (5) scoops and baffles, (5) vacuum system, and (6) casing. Due to the high rotation speed of the rotor, the rotor must be formed of materials selected to reduce the risk of bursting, and the bearing system must be capable of the high rotation speed necessary for separation. The separative capacity of a single centrifuge increases with the length of the rotor and the rotor wall speed. Consequently, centrifuges having long and high speed rotors are desirable. Although the separation factors obtainable from the centrifuge method are large compared to gaseous diffusion, several cascade stages are still required to produce even LEU material. Furthermore, the throughput of a single centrifuge is usually small, which leads to rather small separative capacities for typical centrifuges. Although significant effort has been expended to develop traditional centrifuge based separation methods, there are a number of limitations to be solved, including for example:

1. It is necessary to establish a circular flow pattern within the centrifuge to recirculate the gas mixture because the separation factor of the centrifuge is determined by the ratio of isotopic abundances at the axis of rotation and at the centrifuge wall.

2. Due to the extremely high speeds necessary to induce meaningful separation, the centrifuge must be precisely machined and balanced and in most cases requires operation in a vacuum system to reduce aerodynamic drag and use of magnetic bearings to reduce friction and vibrations. Further, the high rotational speeds results in significant mechanical stresses on the centrifuge wall requiring the use of exotic materials and fabrication techniques to avoid rupture.

4. The pressure differential between the center of the rotor and the outer wall drives the diffusion rate and thus the theoretical efficiency of the centrifuge. However, it also defines the pressure applied to the gas at the outer wall of the centrifuge and if improperly constructed, the large induced pressure may cause the gas to sublimate and condense on the wall of the centrifuge. To avoid this, the center of the centrifuge must be held at a vacuum, significantly limiting the overall throughput of the centrifuge.

An alternative separation process using aerodynamic techniques in conjunction with a specified nozzle geometry was developed E. W. Becker at the Karlsruhe Nuclear Research Center in Germany, separation nozzles of this type are generally referred to as a Becker process nozzle. This process depends upon diffusion driven by pressure gradient effect, similar to the gas centrifuge. In effect, aerodynamic processes can be considered as nonrotating centrifuges. In many cases the centrifugal forces, as used in the Becker process, must be increased by including a cut gas or separation enhancing gas that allows the gas to accelerate faster. For example in the case of uranium separation, this is usually achieved by the dilution of the uranium hexafluoride ($UF_6$) with a carrier gas, (hydrogen or helium), that allows the gas to achieve a much higher flow velocity for the gas to be separated. In this process, the gas mixture of the separation gas and the carrier gas is compressed and then directed along a curved wall at high velocity through a convergent-divergent nozzle. The heavier molecules move preferentially out toward the wall relative to those containing the lighter molecules. At the end of the deflection, the overall gas jet is split by a skimmer into a light enriched fraction and a light depleted fraction, which are withdrawn separately.

Generally the curved nozzle wall of the nozzle may have a radius of curvature as small as 0.0004 inch. Production of these tiny nozzles by manufacturing is technically demanding, and the overall process typically includes stages having multiple vessels containing hundreds of separation elements, gas distribution manifolds, gas coolers to remove the heat of compression, and centrifugal compressors to pressurize the flow.

The Becker process as adapted for separation of uranium, uses a jet of gas consisting of roughly 95 percent hydrogen and 4 percent uranium gas that is expanded through a narrow slit nozzle. The gas moves at high speeds, parallel to a semicircular wall of very small radius resulting in a gas speed comparable to that at the periphery of a gas centrifuge. If the speed of the gas is 400 m/s, and the radius of curvature is 0.1 mm, then the centrifugal acceleration achieved is about 160 million times gravity. These accelerations exceed even those in high speed centrifuges. Additionally these accelerations are achieved with no moving parts. In this method, the centrifugal forces on the molecules cause the streamlines of the heavier components of the gas to move closer to the curved wall compared to those of the lighter components as the gas flows around the semicircle (A streamline in a flowing gas is a line across which no net material transport takes place). At the other side of the semicircular wall, where the gas has changed direction by 180°, a sharp skimmer separates the flow into an inner light fraction and an outer heavy fraction.

Diffusion across a streamline, used by a Becker process nozzle, is analogous to the diffusion against a gravitational or centrifugal force. So all separation processes in the gas occur in directions perpendicular to the streamlines because no net material transport takes place across the streamline. As an example, in a uranium centrifuge the gas is moving in circular paths, so the streamlines are concentric circles. The isotope separation takes place in the radial direction, perpendicular to these streamlines. If a streamline is curved, this implies that the gas is being accelerated, and that a pressure gradient or force must exist perpendicular to the streamline.

In many instances a cut gas is necessary to accelerate the flow through a Becker nozzle. For example in the case of UF6 separation, a significant quantity of hydrogen is typically used to reduce the average molecular weight of the process gas to enable high speed flow to maximize separation effects and it also provides a drag force that enhances the separation process. In many cases the cut gas must dominate the flow, thereby reducing the overall separation efficiency and throughput of the system. For example, in the case of UF6, the hydrogen cut gas ($H_2$) is typically in excess of 95% of the volume of the process gas passing through the Becker process nozzle. The use of a cut gas coupled with the very small size of the Becker nozzles causes the rate of material flow through the process to be small in each nozzle, and several thousand nozzles are necessary to make an enrichment stage of any reasonable size.

As a result of these requirements, the Becker process has a number of significant limitations that have reduced its applicability to general purpose enrichment including:

1. The small size of the curvature wall requires that the nozzle and skimmer components are also minute in size, requiring the components be made of foil material and bonded to assemble even one nozzle. Nano-fabrication is required to form the nozzles, with specifications to the 0.001 mm tolerance.

2. The operating pressure of the process gas is at several bar, usually below 6 bar. The addition of specialized compressors in the cascade add energy to the operating costs to maintain the process at separation pressure.

3. The flow stream along the curvature wall has little if any centrifugal force acting on that streamline, so the 95/5 mixture along the curvature wall dilutes the concentrating heavy isotope stream at extraction, thereby reducing the separation factor by dilution.

4. To reduce the cost of the processing, the add-in hydrogen gas must be cleaned at the end of the process for reflux back into the system, adding another separation process to the cascade.

Another alternative separation technique disclosed in the prior art is the use of a Pitot probe in a supersonic gas mixture, first explained by Fenn and Reis (1963), of the type exemplified in the following U.S. patents—U.S. Pat. No. 3,465,500 to Fenn (1969) and U.S. Pat. No. 3,616,596 to Campargue (1971). It was disclosed that at suitably low Reynolds numbers in a free-expansion jet of nitrogen/hydrogen gas mixture, the gas entering the probe was enriched in the heavier of the two species due to the stagnation effects at the probe tip. It had previously been considered that gas samples taken by such probe effect contained the two-molecular composition of the free-expansion jet that had been separated by radial diffusion effects in the jet upstream of the probe. However, in later experimentation by Rothe (1966), it was revealed that the magnitude of the probe-induced separation measured by Fenn and Reis was up to 50 times greater than that due to radial diffusion in the free jet alone. This determination revealed that it was the shock front preceding the probe that caused lighter specie to follow streamlines around the probe, while heavier specie passed into the probe inlet. This effect has been experimentally and theoretically tested for the separation effect causing minor separation of isotopes, primarily for the potential use in uranium isotope enrichment. Due to the small degree of separation caused by a single probe, the method has not progressed to any commercial degree.

M. R. Bloom, the present inventor, in the early 1990's developed an integrated aerodynamic device and the centrifuge method for the separation of lower molar weight gas mixtures commonly found in the energy and chemical industry sectors. The mechanical device of his work is described in U.S. Pat. No. 5,902,224 to Bloom (the '224 Patent), for a device used for gas mixture separation. In the '224 Patent, a centrifuge device is described for the separation of components of low-molar weight gas mixtures, including natural gas, air, and contaminated air. In this centrifuge device construction, a narrow-gap centrifuge is built consisting of many individual and stacked plates that are spaced from one another to form the centrifuge rotor, and the central area at the axis of rotation for this centrifuge is an open expansion chamber that extends through the height of the centrifuge. The '224 Patent discloses a narrow gap centrifuge with a stationary housing, a rotor with multiple, stacked, inverted pyramidal plates that form channels between the plates. As lighter constituents are separated from the gas mixture they travel down through the device for extraction.

Although the embodiments of the present device and method are described in combination with and in some cases contrasted to the theory and method of this previous art, this is not intended to limit the claimed invention in any sense.

SUMMARY DISCLOSURE OF THE INVENTION

The present invention is directed to a device and method that substantially improves upon limitations and disadvantages of related art, and describes the apparatus and method for energy and chemical applications in industry. The present disclosure is provided in terms of exemplary embodiments that are adapted to the separation of natural gas into its separate components, e.g., light and heavy components, and for dewatering (i.e. removing water from a natural gas stream). However, this is for convenience only, and these illustrative applications are only described to provide those of ordinary skill in the art an exemplar suitable for guiding the adaptation of the present device and method for use in other applications for the separation of isotopes, compounds, gas species, and aerosolized substances, all more generally referred to as particles.

The device and method comprise, in part, a centrifuge having a rotatable rotor contained within a casing or housing. One embodiment of the device comprises a separation rotor for placement in the housing. The separation rotor has an inlet portion, an outlet portion, and a gas flow path between the inlet portion and the outlet portion. The inlet portion has an inlet port for supplying to the separation rotor a gas to be separated into its components. The outlet portion includes a nozzle(s), a gas skimmer(s) spaced from the nozzle(s), a diffuser section spaced beyond the gas skimmer(s), and at least two outlet ports for removing separated components of the gas from the separation rotor. When the separation rotor is placed in the housing, the inlet portion of the rotor is located near the axis of rotation, and the outlet portion near the periphery of the rotor.

In one other aspect, the device and method comprises a centrifugal separation apparatus having a rotatable centrifuge rotor, a housing for the rotor, an inlet portion of the rotor for gas supply to the rotor, located near the axis of rotation of the rotor, and a linear nozzle and gas skimmer system receiving gas supplied by the inlet portion of the rotor, extending from the axis of rotation of the rotor to the periphery of the rotor. The outlet portion of the rotor includes a blocked zone that diverts light fraction enriched components of the gas in a first zone of the rotor through an outlet manifold located underneath the rotor, and includes a second tangential outlet for light fraction depleted components to outlet the rotor at its periphery.

In an additional aspect, the device and method includes, in part, the linear nozzle and gas skimmer system which is configured as a nozzle ring of multiple convergent nozzles, a gas skimmer ring of multiple gas skimmers separated from the nozzle ring, that is configured as divergent deflectors with critical throats at their apex, a second gas skimmer ring of multiple gas skimmers separated from the first gas skimmer ring and similarly configured as divergent deflectors with critical throats at their apex. The convergent nozzle throat outlet, and the first gas skimmer critical throat inlet, and the second gas skimmer critical throat inlet, are aligned to allow a linear gas flow to progress from the convergent nozzle(s) through the subsequent separated gas skimmer(s) in a concentrated gas jet. The convergent shape of the nozzle(s) compresses the inlet flow to the nozzle throat and expands gas at a sonic value toward the first gas skimmer(s). The divergent shape of the first gas skimmer(s) deflects sonic gas from the nozzle that has expanded beyond the critical throat dimensions to outlet in the first outlet zone, and allows the inlet of sonic gas from the nozzle(s) that is within the dimensions of the skimmer critical throat to pass through the first gas skimmer(s). The divergent shape of the second gas skimmer(s) deflects the sonic gas passing through the first gas skimmer that has expanded beyond the critical throat dimensions of the second gas skimmer to outlet in the first outlet zone, and allows the inlet of sonic gas from the first gas skimmer(s) that is within the dimensions of the second gas skimmer throat to pass through the second gas skimmer(s) to the second outlet zone at the periphery of the centrifuge rotor.

In one other additional aspect, the rotation of the rotatable centrifuge rotor acts upon the sonic gas flow through the linear nozzle and gas skimmer system with centrifugal force that is in relation to the radius of the overall centrifuge rotor and to the rotation speed of the rotatable centrifuge rotor. The addition of the centrifugal force from the rotatable centrifuge rotor enhances or augments the effective force applied to the sonic gas flow at its core that is proceeding from the convergent nozzle(s) and through the critical throats of the first and second gas skimmer(s) in this manner the centrifigal acceleration enhances the separation effects at the convergent nozzle. The addition of the centrifugal force due to the rotation of the centrifuge rotor adds pressure to the sonic gas beam flow in an increasing amount in relation to the radius of the centrifuge rotor. In applications where phase change occurs through the nozzle skimmer arrangements, the heavier, liquid phase separation is also enhanced based upon the mass difference within the centrifugal field.

In a second additional aspect, the gas flow through the linear nozzle and gas skimmer system is brought to a sonic velocity through the convergent nozzle, and is subsequently recompressed through the critical throats of the first and second gas skimmers to maintain a sonic velocity value. Upon passing through the nozzle(s) throat and each gas skimmer throat, the gas beam at sonic velocity experiences a reduction in volume pressure and through expansion, latent heat releases from the sonic velocity gas establishes in a perpendicular direction to the linear gas flow path. Further, low-pressure zones are established in the zones that separate the nozzle and first gas skimmer, and the first gas skimmer as well as the second gas skimmer, thereby the core of the sonic velocity gas is at a larger pressure when compared to the low-pressure zones between the nozzle and skimmer, as well as the skimmer and skimmer structures.

In yet another aspect, the invention includes a centrifugal separation apparatus having a rotatable centrifuge rotor, a housing for the rotor, an inlet portion of the rotor for gas supply to the rotor located near the axis of rotation of the rotor, a curved nozzle and gas skimmer system that is formed near the periphery of the centrifuge rotor, and an outlet portion of the rotor. The outlet portion of the rotor includes a blocked first outlet zone that diverts deflected light component flow to leave the rotor near the axis of rotation of the rotor, and has a second outlet zone that acts as a diffuser and outlet at the periphery of the centrifuge rotor for skimmed light depleted flow.

In an additional aspect, the curved nozzle and gas skimmer system is configured to include a nozzle chamber and nozzle insert that fits into the nozzle chamber, and a nozzle gas reservoir on the nozzle chamber's one flank, and a skimmer diffuser on the nozzle chamber's opposite flank. With the nozzle insert installed into the nozzle chamber, a continuous gas beam flow path is formed from the nozzle gas reservoir, along the outer curved periphery of the nozzle chamber, and into the skimmer diffuser. The overall gas beam flow path passing through the nozzle and skimmer system is curved and is primarily parallel to the curved periphery of the centrifuge rotor, and is subsequently perpendicular to a radial line that might be drawn from the axis of rotation of the centrifuge rotor to the rotor periphery edge. The nozzle insert is fabricated in such a manner, so that when the insert is installed into the nozzle chamber, several components are formed in relation to the nozzle chamber, including; a convergent-divergent nozzle, a first gas expansion zone, and a gas skimmer, all formed between the fabricated edge and body of the nozzle insert and the nozzle chamber periphery edge, in a relationship where the convergent-divergent nozzle receives gas inlet form the nozzle gas reservoir and compresses the gas and expands the gas through the convergent nozzle throat, and the compressed and expanded gas follows a curved gas flow path formed between the nozzle insert and the nozzle chamber wall. At the outlet of the divergent sector of the nozzle, there is an expansion zone formed in the curved relationship and a subsequent gas skimmer that deflects a fraction of the flow into the expansion zone, and collimates a fraction of the flow into the following diffuser zone.

In a second additional aspect, the formation of the integrated convergent-divergent nozzle, followed by an expansion zone, and further followed by a gas skimmer, all built in a curved relationship that is perpendicular to the radial vector of the rotor, causes the gas flow to have additional forces acting upon it. The use of a convergent-divergent nozzle allows for the compression and subsequent expansion of the gas beam to reach an elevated sonic velocity in a range of from 1.5 to 3.5 mach. With the gas beam at its current mach value flowing along a curved radius of a separation nozzle, a first centripetal acceleration is imposed on the gas stream due to the supersonic velocity of the gas beam and the curve of the flow path. A second force that augments the centrifugal acceleration is imposed on the entire nozzle structure, including the gas stream flowing through the nozzle structure. This additional centrifugal force stems from the rotation of the centrifuge rotor and is imparted at the curved boundary wall of the nozzle chamber. In one aspect, the centrifugal force from the rotation of the rotor enhances the separation forces imparted by the gas flow. In a second aspect, the rotation of the rotor services to modulate the separation forces imparted by the gas flow whereby the imposed acceleration due to the rotation of the rotor urges the heavier mass away from the curved boundary wall of the nozzle chamber when the curved boundary wall is concave away from the center of rotation of the rotor disk. Further, beyond the outlet of the convergent-divergent nozzle, an expansion zone is formed extending toward the axis of rotation that allows expansion fraction to move in one radial direction. Finally, the skimmer distance from the convergent-divergent nozzle outlet is longer in distance when compared to a linear design for a nozzle and gas skimmer system by virtue of the circumferential flow path, thereby allowing longer exposure to the centrifugal force.

In another aspect, the invention describes the device being powered in rotation speed by the pressure and volume of the incoming gas. In this manner of operation, a turbine-style impeller precedes the centrifuge rotor, and the impeller is mounted to the same centrifuge rotor shaft as the centrifuge rotor, and by the geometric configuration of the impeller, incoming pressurized gas of larger volume causes the impeller, the centrifuge rotor shaft, and the centrifuge rotor to spin accordingly.

In an additional aspect, the invention describes the device being rotationally driven by a multitude of different types of rotary actuators or more generally torque generators, such as an electric, a hydraulic, pneumatic, air turbine, or a magnetic motor or other source of rotational energy including a drive shaft connected to an internal combustion engine, turbine, wind turbine, or hydro turbine.

In a further aspect, the invention provides a method for gas component separation from a gas mixture. In the method, a rotatable centrifuge rotor rotates about an axis of rotation and the gas to be separated enters the centrifuge rotor. The gas mixture is compressed in a convergent sector of a nozzle and is expanded through the nozzle throat outlet to a velocity that is at least sonic and may be supersonic in value. In the process of expansion, the gas beam increases in velocity and decreases in temperature and pressure in the expansion or stagnation zone. The core of the gas beam in this process has forward movement while a fraction of the flow diverts from the core in a fan expansion mode, and it is thought that the diverting fraction is diffusive in nature, and more volatile or lighter in mass than the heaviest specie in the core flow.

In an even further aspect, it has been shown that a shock front is established before skimmer structure critical throats, caused by backward-facing pressure to the forward movement of the sonic gas jet core. This developed shock structure slows the sonic velocity flow, in turn adding volatile specie diffusion to the expansion flow, and creating deflecting streamlines around the skimmer structure while the core segment recompresses and expands through the critical throat, returning to sonic velocity. Also, through the rotation of the centrifuge rotor, pressure is added into the core flow as it continues its forward progress, again establishing the high pressure zone within the centrifuge rotor.

In another aspect, the invention includes a method for increasing centrifugal pressure during the separation process by forward high velocity flow along a curved path while the centrifuge rotor is rotating. In this method, concentration of the flow due to centripetal acceleration induces a pressure applied in the direction of the periphery of the curved path, and during the expansion phase in the stagnation zone, lighter specie diffuse toward the axis of rotation of the centrifuge rotor during subsequent pressure and temperature release, concurrently the rotation of the centrifuge rotor adds pressure forcing the flow toward the curved boundary wall, enhancing the concentration of the heavier specie and diffusion of the lighter specie toward the center of rotation. In this aspect, the curvature of the nozzle is concave toward the center of the rotor center of rotation to enhance separation effects. This added pressure energy is an added factor when compared to the Becker separation nozzle system, minimizing boundary flow dilution during the flow process.

In another aspect, the invention includes a prenucleation chamber for pretreatment of gas prior to its centrifugation involving a sonic-transonic-sonic aerodynamic flow component that encourages the separation of a heavier gas specie from a lighter gas specie by means of an isentropic expansion process.

It should be understood that the summary general description and the following description are exemplary, and are meant to provide explanation of the invention as claimed.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawings in which the reference number first appears.

FIG. 22 is a detailed view the inlet of the device assembly of FIG. 21.

MODES FOR CARRYING OUT THE INVENTION

Figure 1:
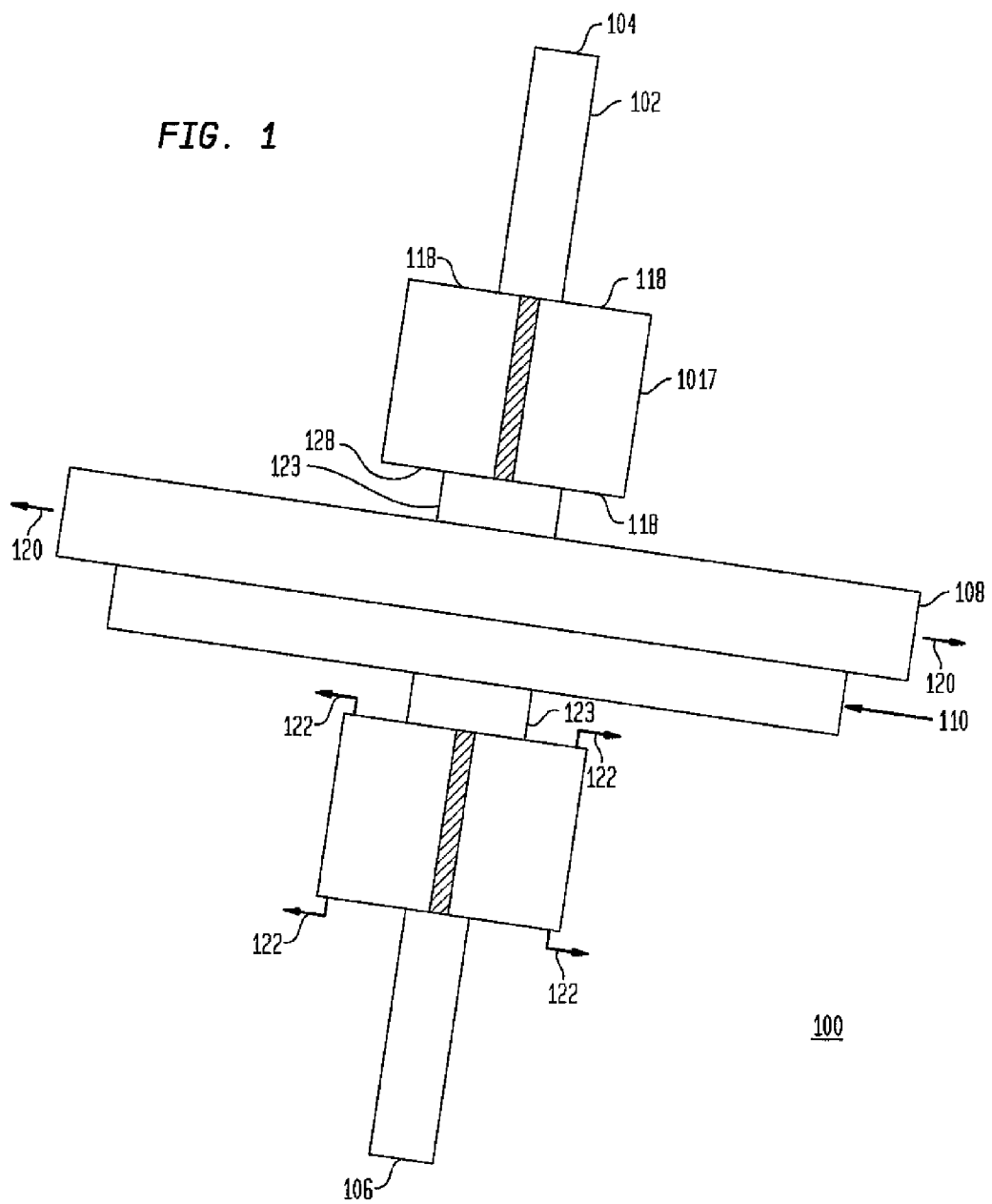
FIG. 1 is a side view of a gas separation device of the present invention without a disk cover plate.

Embodiments of the present device and method are referred to herein generally as a, "separation device." Exemplary embodiments of the separation device include a centrifuge rotor configured in multiple embodiments, including a linear nozzle-gas skimmer system, a curved nozzle system, or combinations thereof. As used herein, the terms "exemplary" indicates a sample or example. It is not indicative of preference over other aspects or embodiments. An embodiment of the linear nozzle-gas skimmer system uses a separation configuration having a convergent nozzle followed by a first gas skimmer and followed by a second gas skimmer arranged to correlate and operate in a rotatable centrifuge rotor. A second embodiment of the curved nozzle based separation device uses a nozzle insert, an inlet mouth, a nozzle throat connected to a divergent outlet via a concave divergent nozzle, and a skimmer throat. As used herein, the embodiments of the separation configurations with a linear nozzle-gas skimmer, curved nozzle based separation device or combinations thereof are generally referred to as "means for separating" or "separation means" and induce a separation of a gas into constituent components, such that the constituent components are at least partially differentiated according to average mass.

As will be apparent to one having ordinary skill in the art, the present device and method is in some embodiments used in a centrifuge system where progressive concentration and separation is continuously performed in stages, similar to a cascade, where multiple steps are integrated into a single rotatable centrifuge rotor, or when more than one rotatable centrifuge rotor is combined to increase the separation effect and/or throughput volume. As used herein the term separation of a gas means the cutting or isolation of the gas stream into two or more constituents based on the mass characteristics of the gas itself. To describe the output of this separation, at various times herein, the constituents are referred to as heavy or light particle enriched or depleted gases or streams of gas, or alternatively as mass fractions whereby the mass fraction is an average characteristic or average mass of the particles that comprise that constituent gas or stream of gas. For example, multiple separation devices may be arranged in parallel where each separation device is input substantially the same input gas mixture with the goal of outputting substantially the same separated gas constituents to increase the total mass throughput in a single installation of separation devices. In another example, multiple separation devices are installed in a cascade or series arrangement whereby the separated constituents of the prior separation device are used as inputs to the next sequential separation device. In this manner, as a gas mixture travels through the cascade specific gas or particle species are targeted and separated to greater purity. As known to those of ordinary skill in the art, one may arrange various different combinations of parallel and series configurations of separation devices to achieve desired separation throughput and separation quality. In still another embodiment, the one or more separation devices are place placed in a closed circuit system, whereby one of the separated gas species output from the separation device is used as an input to the separation device, while the other gas stream or streams are partially removed from the system. In this manner, over time, the mixture of the gas mixture remaining in the system will trend toward that of the desired gas species.

Embodiments of the separation device combine aerodynamic separation process within a centrifuge rotor whereby heavy fraction specie concentrate in a high pressure region and light specie fraction separate through diffusive transport by combined forces including centrifugal force, centripetal acceleration, shock induced pressure, gas expansion, and perpendicular heat release from pressure. The action of the rotor further enhances the aerodynamic process by the addition of centrifugal force in the pressure zone, and this correlation between the rotor and the expansion process provides additional separative effect and throughput potential in a compact device.

Figure 2:
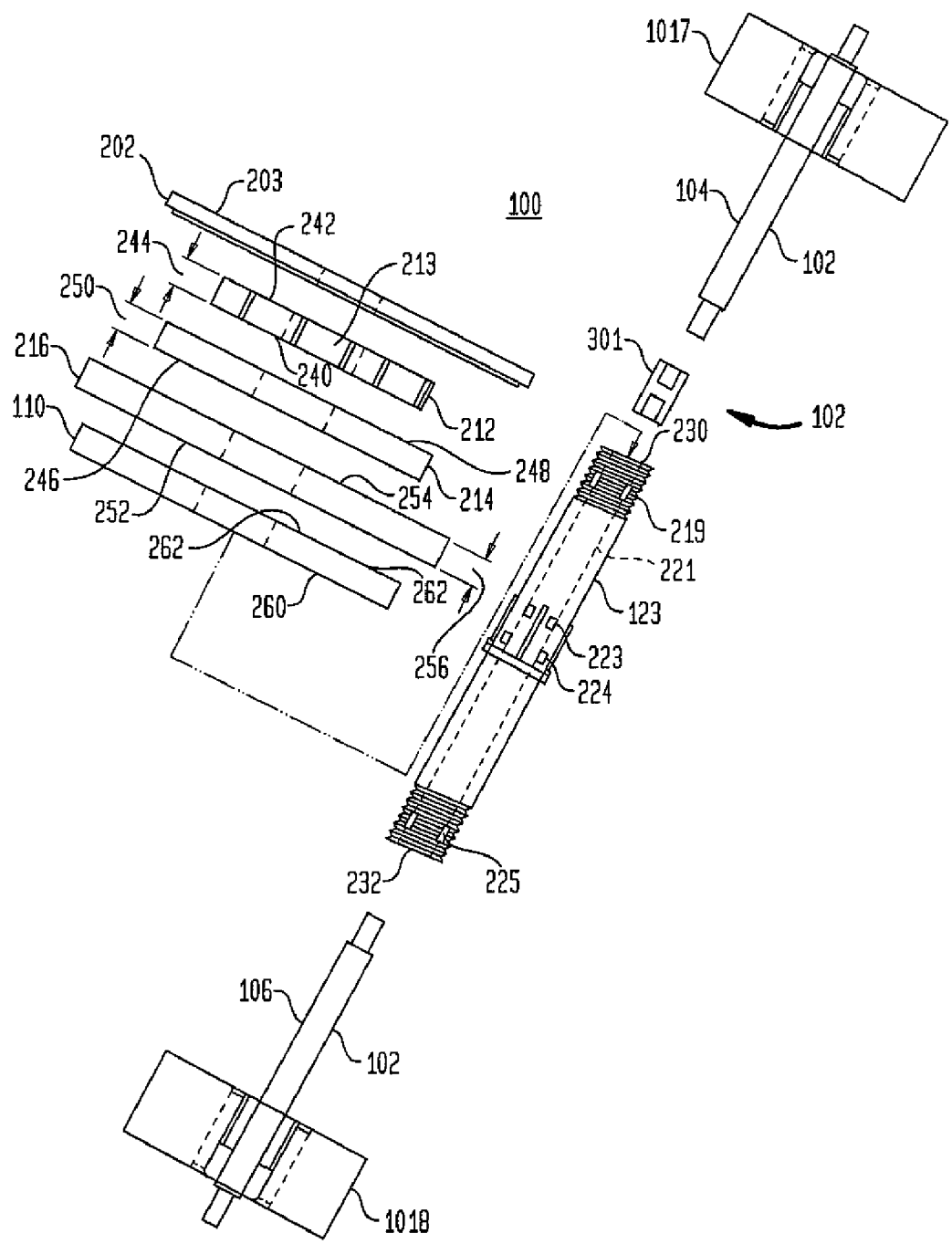
FIG. 2 is an exploded view of a gas separation device of FIG. 1.

The embodiments of the separation device shown in FIG. 1 and FIG. 2, comprises a rotatable centrifuge rotor 100 that is constructed in one embodiment for the concentration and separation of components of a gas mixture, such that an inlet gas 118, e.g., natural gas or other gas to be separated, is introduced into the centrifuge rotor 100 and the centrifuge rotor 100 separates the inlet gas 118 into a light specie depleted fraction 120 (i.e. heavy component) and a light enriched gas referred to in the alternative as the heavy depleted gas, the light component, or light specie enriched fraction 122. This embodiment lends itself effectively to the contaminant separation and processing of pressurized and contaminated air, such that this depiction shows the compact nature of the centrifuge rotor device 100 and its application and installation in a pressurized pipeline. The present invention is described in terms of application to air, but this is for convenience purpose only. It would be readily apparent to one of ordinary skill in the relevant art to design and use a centrifuge rotor 100 of the present invention for concentration and separation of alternative gases, such as natural gas or for the concentration and separation of particles other than gases that are susceptible to centrifugation.

As shown in FIG. 1, the centrifuge rotor 100 has a centrifuge rotor shaft 102 on which the centrifuge rotor disk 108 is mounted by attachment means such as thermal press-fitting or by a spline system or by a locating keyway, via the central hub 123. In one embodiment, the centrifuge rotor 100 is between about 200 mm to about 300 mm in diameter and more preferably about 254 mm in diameter.

Figure 3:
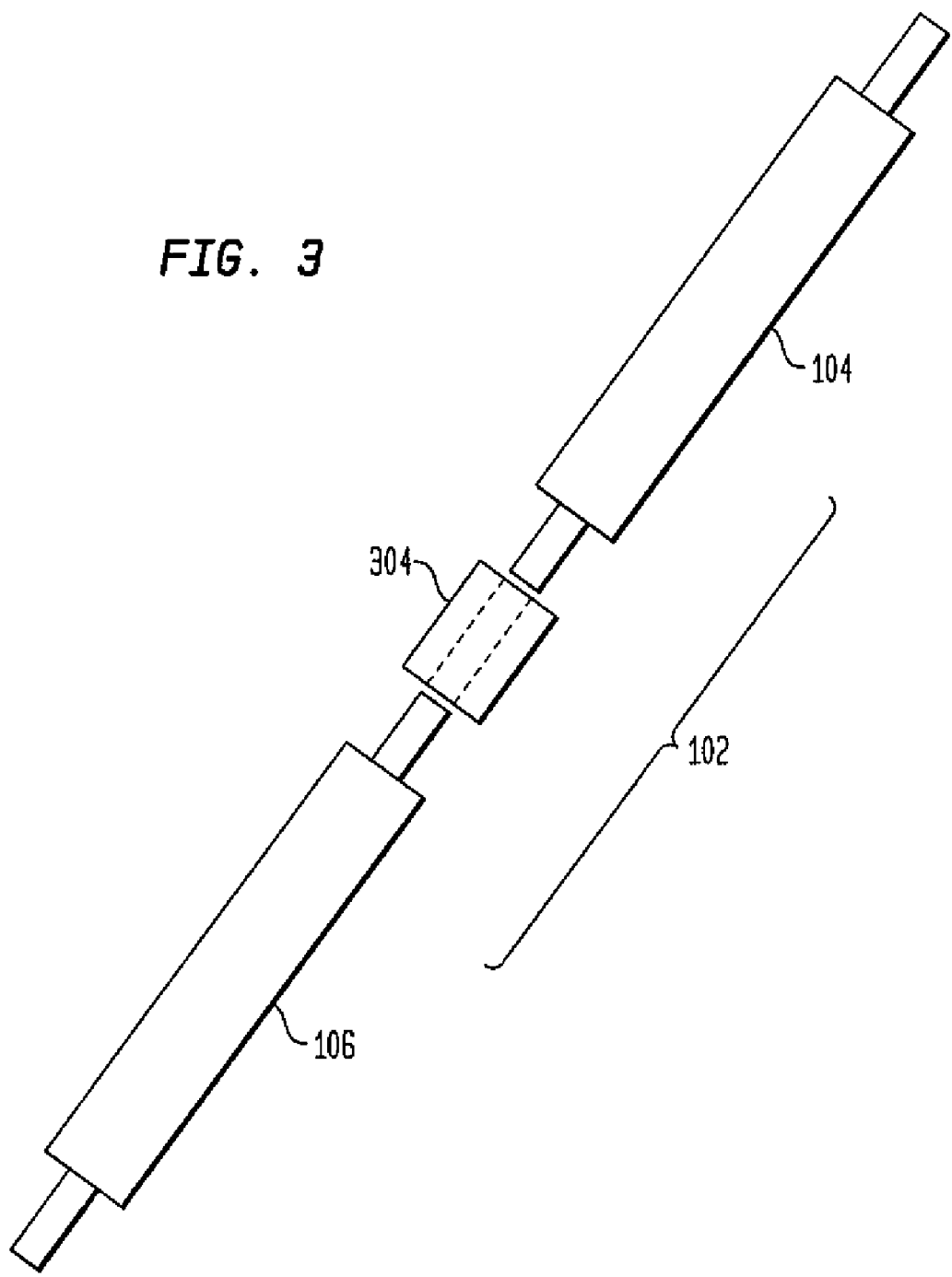
FIG. 3 is an exploded view of a centrifuge rotor shaft

The centrifuge rotor shaft 102 in the embodiment depicted is an elongated three-piece solid shaft having an inlet side end 104 for supporting the shaft within a bearing, and outlet side end 106 for supporting the shaft within a bearing, and the mid-point of the centrifuge rotor shaft 102 is approximately half of its length. As shown on FIG. 3, the inlet side end 104 is pressure fit within a first matching end of a barrier piece 301 while the outlet side end 106 is pressure fit within a second matching end of the barrier piece 301. In alternative embodiments, the inlet side end 104 and the outlet side end 106 attached to the barrier piece 301 by a locating keyway, spline shaft system, taper, or thermal, press-fit. The barrier piece 301 functions as a means for blocking the incoming gas in the central hub 123 to force it through the gas port passages 219 (see FIG. 2).

As shown in FIG. 2, the gas centrifuge rotor device 100 in its linear assemblage comprises a nozzle ring 212, a first skimmer ring 214, a base and second skimmer ring 216, a collection manifold 110, and a central hub 123 and a disk cover plate 202, all of which are adapted to interface with adjoining elements. The centrifuge rotor disk 108 provides a means for concentrating and separating the contaminated or inlet gas 118 into a light depleted gas 120 and heavy depleted gas or light specie enriched fraction 122. In one embodiment, the central hub 123 is sized to fit into the nozzle ring 212, which in turn is sized to fit within the first skimmer ring 214, which in turn is sized to fit with the base and skimmer 216, which finally is attached to the collection manifold 110.

In the embodiment depicted in FIG. 2, central hub 123 is an elongated hollow tube, cylindrical in shape, with a centrally located bore 221 sized to fit the rotor shaft 102 by either thermal press-fit or by a spline system or by a locating keyway, and the outer dimension of the central hub 123 is sized to be thermally press-fit into the central bore 213 of the nozzle ring 212. The central hub 123 also has gas port passages 219 that are concentrically formed around the centrally located bore 221 to allow inlet gas 118 into the central hub 123, and has gas ports 223 to transmit the inlet gas 118 to the nozzle ring 212. In this fashion, the inlet gas 118 linearly enters the central hub 123, where it encounters the barrier piece 301 that prevents the inlet gas 118 from passing further along the central hub 123 causing it to turn approximately 90° to enter the nozzle ring 212 via the gas port passages 219. This gas flow transition keeps the inlet gas 118 entering the nozzle ring 212 at its smallest velocity and at its normal pressure. The gas port passages 219 are located on the portion of the central hub 123 that constitute the inlet end 230 of the central hub 123. As used herein the term "velocity" when referring to flow refers to the substantially free stream velocity or, in the case of channel flow with substantially no free stream flow, the mean velocity of the fluid within a channel.

Figure 10:
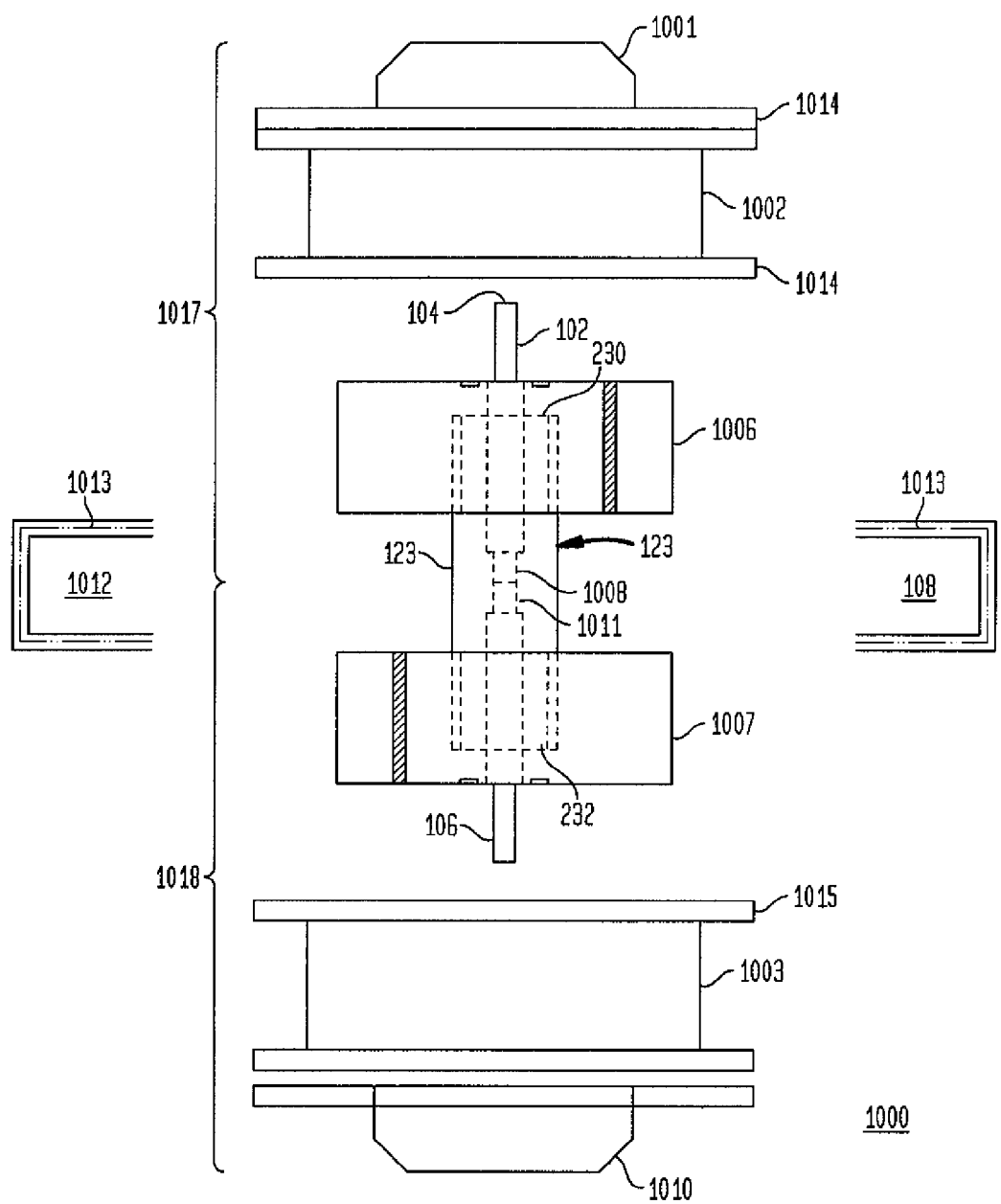
FIG. 10 is a side view of the drive motor and gas pump system.

The opposite end of the central hub 123 is the outlet end 232, are outlet gas port passages 224 fabricated into the periphery wall of central hub 123 and outlet gas port passages 224 turn internally in the central hub 123 in about a 90° sweep to outlet the central hub 123 as outlet gas ports 225. Outlet gas ports 225 function as a passage for the light specie enriched outlet for the centrifuge rotor 100, receiving light specie enriched fraction 122 from the inlet gas 118 from the collection manifold 110. On its ends, both the inlet end 230 and the outlet end 232, the central hub 123 is threaded for receiving the gas drive impeller 1006 (the inlet side), and threaded for receiving the gas pump impeller 1007 (the outlet side), as shown in FIG. 10.

Figure 7A:
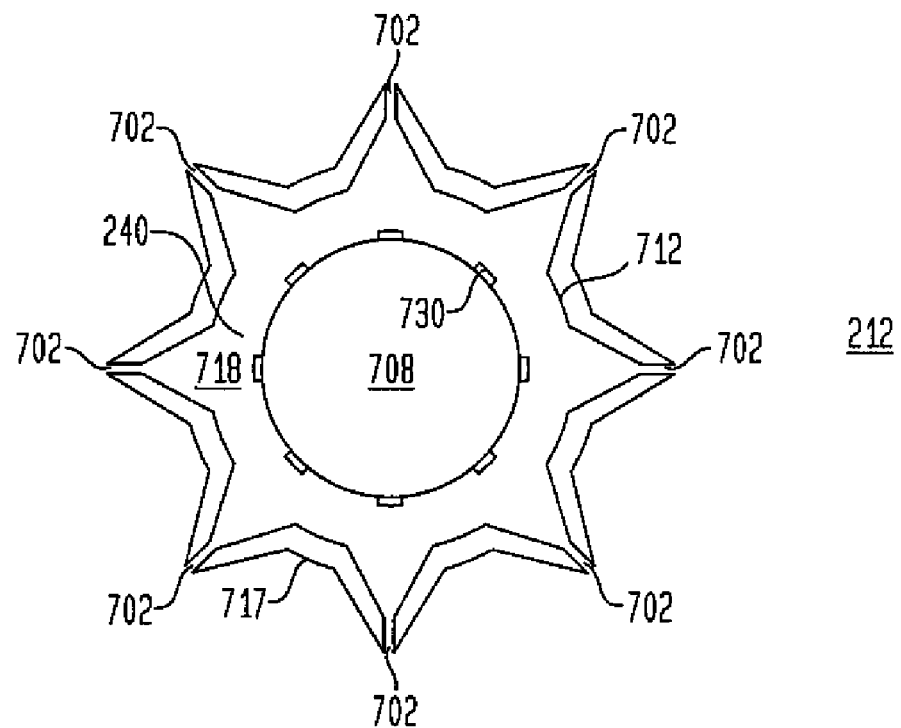
FIG. 7A is a top view of a nozzle ring.

In the embodiment of a separator device shown in FIG. 7A, the nozzle ring 212 is generally star-shaped having a bottom surface 240 (see FIG. 2) with a centrally located opening 708, and a side wall 712 with a plurality of convergent nozzles 702 spaced at regular intervals along it periphery. The opening 708 is sized for receiving the outer dimension of the central hub 123. The opening 708 in the embodiment shown has a plurality of square keys 730 adapted to interface with the central hub 123 and rotatably fix the nozzle ring 212 to the central hub 123, thus causing the nozzle ring 212 and the central hub 123 to rotate in tandem. A annulus chamber 718 is formed within the bottom surface 240, the side wall 712, the outer walls of the central hub 123 (not shown in FIG. 7A), and the disk cover plate 202.

Figure 7B:
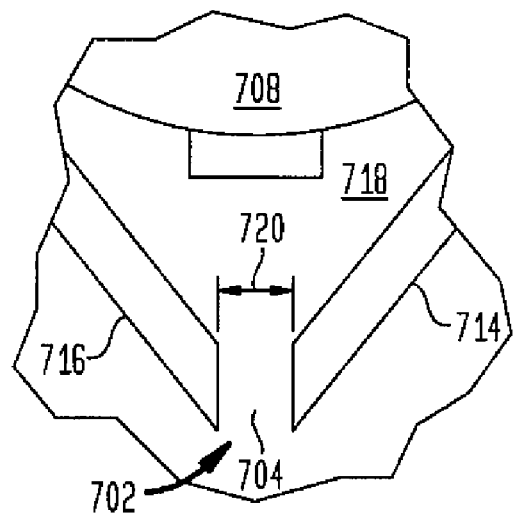
FIG. 7B is a further detailed view of part of the nozzle ring of FIG. 7A.

One embodiment of a convergent nozzle 702 is detailed in FIG. 7B. A convergent nozzle 702 is generally V-shaped, protruding outwardly from the opening 708 and having a nozzle throat 704 at the apex of a first nozzle wall 714 and a second nozzle wall 716. The first nozzle wall 714 and the second nozzle wall 716 are both generally referred to as side walls 712. The nozzle throat 704 is a slim slit defined by a width 720 and extending a pre-defined height 244. In one embodiment, the height 244 is defined the distance between the top surface of the side wall 242 to the inside bottom surface 240. In another embodiment the height 244 is the thickness of the nozzle ring 212 and the upper and lower edges nozzle throat 704 are formed by the bottom surface 240 and the bottom of the disk cover plate 202.

In a second embodiment, the bottom surface 240 is eliminated from the nozzle ring 212 and the side walls are affixed to a portion of the nozzle ring 212 adapted to mate with the rotor shaft 102 using a web or series of supporting elements. In this embodiment, the bottom surface 240 is functionally replaced by the top surface of the first skimmer ring 214. In this manner, the nozzle throat 704 is formed by the disk cover plate 202, the first nozzle wall 714 and the second nozzle wall 716 and the top surface 254 of the base and second skimmer ring 216.

In an embodiment separation device, the convergent nozzle 702 is adapted to eject the pressurized inlet gas 118 at Mach numbers ranging from transonic ranges to supersonic ranges. The convergent shape of the sidewalls 714 and 716 is configured from the width of the nozzle throat 704, where sidewall 714 angles from its edge of nozzle throat 704 in a range of from about −12° to about −25° half-angle, and similarly sidewall 716 angles from its edge of the nozzle throat 704 in the same range. The width 720 of the nozzle throat 704 is calculated from nozzle equations for convergent nozzles to reach sonic value from a pressurized gas, and the width 720 of the nozzle throat 704 in the embodiment depicted range from about 0.5 to about 2.5 mm. The nozzle throat 704 is adapted to allow the desired volume of inlet gas 118 to flow through the nozzle throat 704 at the desired Mach range. Based on this goal, in the embodiment shown, the height 244 is nominally in the range of about 5 to about 50 mm.

Figure 6A:
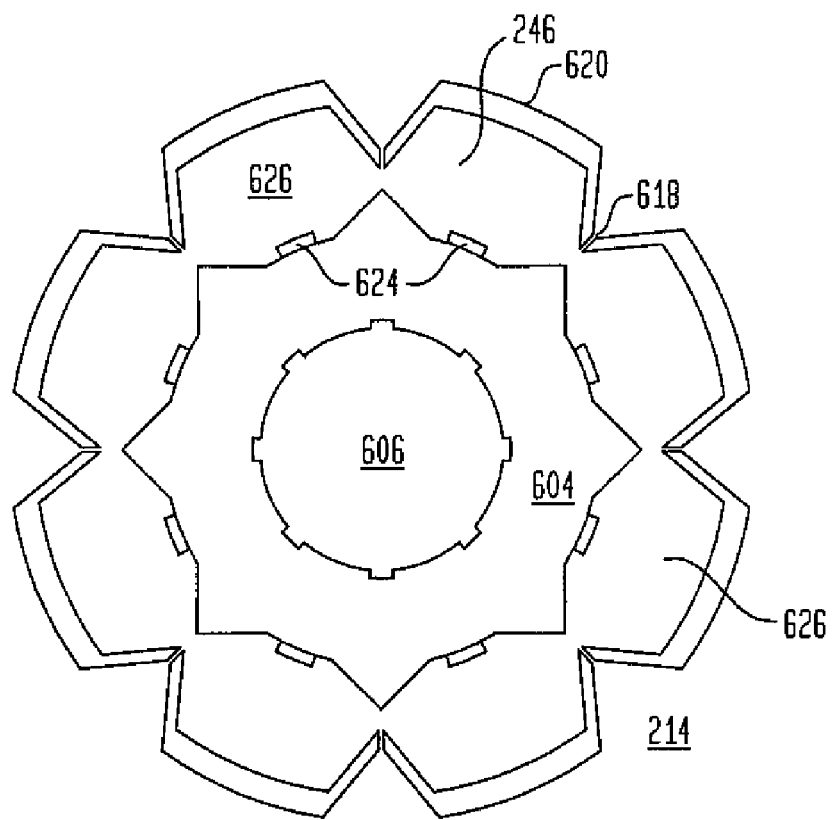
FIG. 6A is a top view of a first skimmer.

In the embodiment the separation device shown in FIG. 6A, the first skimmer ring 214 is generally circular in shape having a wider diameter than the outer diameter of the nozzle ring 212. The first skimmer ring 214 has a bottom surface 246 and a top surface 248 (see FIG. 2) with a nozzle ring receptor 604 and an opening 606. The opening 606 is sized to receive the peripheral shape of the central hub 123. The nozzle ring receptor 604 is a recessed portion of the bottom surface 246 that has a peripheral shape and size corresponding to the peripheral shape and size of the nozzle ring 212. Thus, the nozzle ring 212 in the embodiment depicted is disposed within the nozzle ring receptor 604.

Figure 6B:
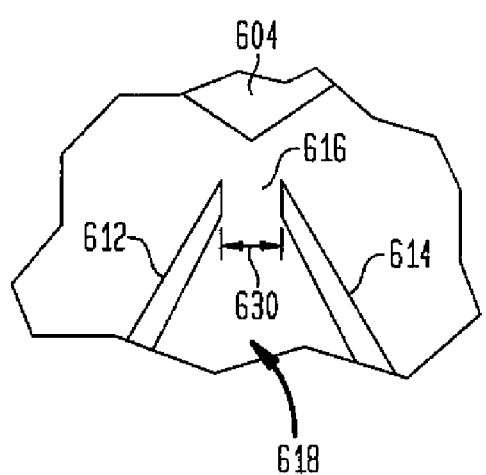
FIG. 6B is a further detailed view of part of the first skimmer of FIG. 6A.

The first skimmer ring 214 has a plurality of inverted V points 618 spaced at regular intervals along its periphery. In this embodiment, the periphery of the first skimmer ring 214 is composed of a plurality of adjacent, generally block, U-shaped walls 620 that create a chamber 626. As shown in FIG. 6B, the intersection of two adjacent, generally block, U-shaped walls 620 form an inverted V-point 618 at the intersection of a two side walls 612 and 614, both generally a U-shaped wall 620. A critical throat 616 is formed at each inverted V-point 618 by two side walls 612, 614. The angle of the two side walls 612, 614 create a deflection surface for oncoming expanding gas, and the angle of the deflection surface along the two side walls 612, 614 is generally in a range of from about 24° to about 35° half-angle from each side of the critical throat 616. The height 250 of the first skimmer ring 214 of the first critical throat 616 corresponds to the height 244 of the nozzle throat 704, and the width 630 of the critical throat 616 is generally about two to about six times the width 720 of the nozzle throat 704. The first skimmer ring 214 also has a plurality of gas vents 624 in the bottom surface 246 disposed such that one gas vent 624 is disposed between each pair of V-points 618 and near outside of the first nozzle wall 717 of the nozzle ring 212. The gas vents 624 vent deflected gas from the two side walls 612, 614, maintaining a low-pressure or stagnation zone in the chamber 626 between the nozzle ring 212 and the first skimmer ring 214. The combination of the two side walls 612, 614 and the critical throat 616 and v-point 618 form an embodiment of a body referred to herein generally as a "skimmer."

Figure 5A:
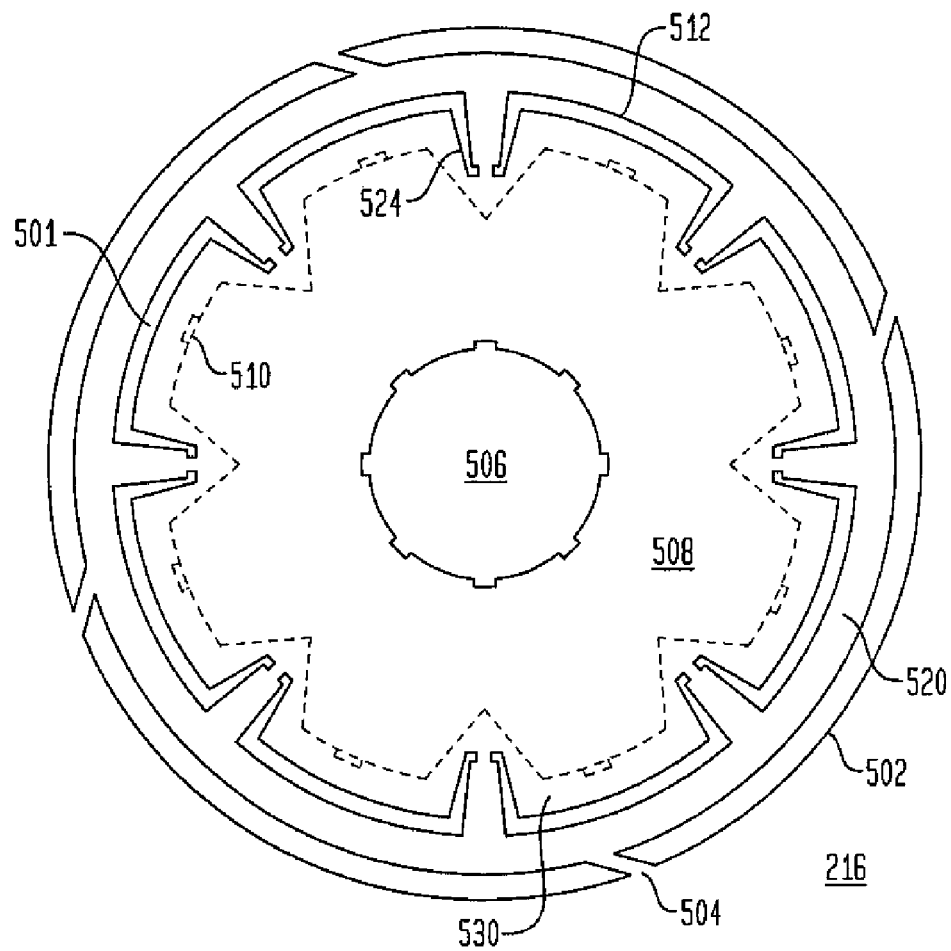
FIG. 5A is a top view of a base and second skimmer.
Figure 5B:
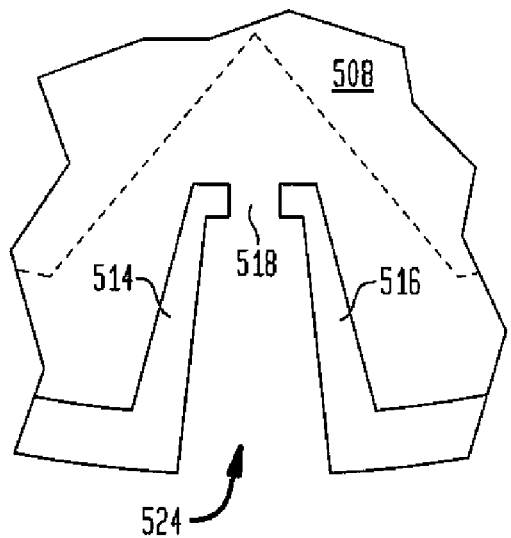
FIG. 5B is a further detailed view of part of the base and second skimmer of FIG. 5A.

In the embodiment shown in FIG. 5A and FIG. 5B, a base and second skimmer ring 216 is designed and sized to receive the first skimmer ring 214. Specifically, the base and second skimmer ring 216 has a bottom surface 252 (see FIG. 2) with a first skimmer receptor 508 and an opening 506. The opening 506 is sized for receiving the periphery surface of the central hub 123. The first skimmer receptor 508 is a recessed portion of the bottom surface 252 that has a peripheral shape and size corresponding to and adapted to accept the peripheral shape and size of the first skimmer ring 214. Thus, the first skimmer ring 214 is disposed within the first skimmer receptor 508.

The periphery of the base and second skimmer ring 216 is circular in shape and has a diameter greater than the diameter of the first skimmer ring 214. The outer wall 502 of the base and second skimmer ring 216 has a plurality of outlet ports 504 spaced at regular intervals along its periphery. The height 256 of the outlet ports 504 corresponds to the height 244 of the nozzle throat 704. The centrifuge rotor disk 108 is disposed in a skimmer housing 1013 (see FIG. 10) which is adapted for receiving the light depleted gas 120 exiting the outlet ports 504 of the centrifuge rotor disk 108.

The base and second skimmer ring 216 has an interior wall 501 extending above the bottom surface 522 and positioned between the outer edge of the first skimmer receptor 508 and the outer wall 502. A plurality of second critical throats 518 are located at regular intervals along the interior wall. As shown in FIG. 5B, in one embodiment, the interior wall 512 is composed of a plurality of adjacent, generally block-U shaped, walls that together form a plurality of apex skimmers 524, also referred to herein as a type of or simply as an V-point skimmer, at the intersection of two side walls 514, 516. A second critical throat 518 is formed at each inverted V point, or apex skimmer 524 by two side walls 514, 516, and again, the two side walls 514, 516 act as deflection surfaces for the oncoming gas expansion from the critical throat 616, and the angle of deflection for side walls 514, 516 are in a half-angle range of from about 12° to about 24°. The apex skimmer 524 of the base and second skimmer ring 216 in one embodiment is blunt with the side wall deflection angle figured at the edge of the apex skimmer 524, and the width of the blunt apex or apex skimmer 524 is in the a range of about 5 to about 15 mm. The second critical throat 518 in this apex skimmer 524 embodiment is centered in the apex skimmer 524 as either a narrow slit from about 1.5 to about 5 times the width 720 of the nozzle throat 704, with a height 256 of the second critical throat 518 that matches the height 244 of the nozzle throat 704. The apex skimmer 524 of the second skimmer in another embodiment is a V-point, similar in overall shape as the V-point 618, with the deflection angle of the two side walls figured from the width edges of the second critical throat 518, with the dimensions of the second critical throat 518 being equivalent to the first embodiment discussed immediately above. A chamber 530 is formed between the outer wall 502 and the interior wall 512. The base and second skimmer ring 216 also has a plurality of second gas vents 510 in the bottom surface 252 such that there is a second gas vent 510 associated with each the interior wall 512 that has a generally block-U shape.

An outlet diffuser channel 520 is located in the space between the interior wall 512 and the outer wall 502, and connects the gas entering the second skimmer critical throat 518 to the outlet ports 504 that pass through the outer wall 502 at a tangential angle in accordance to the rotation of the centrifuge rotor 100.

Figure 8:
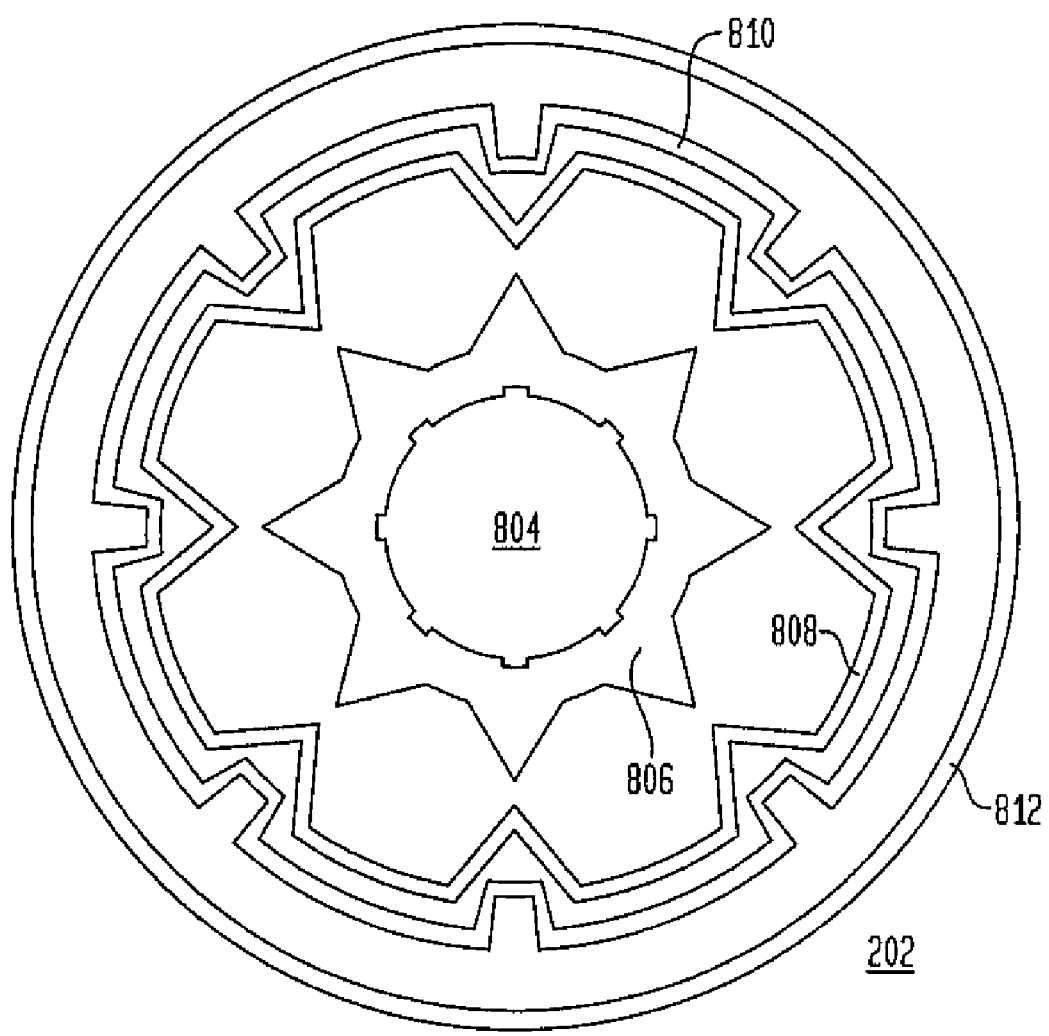
FIG. 8 is a bottom view of a disk cover plate.

In one embodiment of the centrifuge rotor disk 108, a vector connecting the following elements is logically drawn to defining alignment of the elements as shown in FIG. 8.

The convergent nozzle 702 and more specifically the nozzle throat 704 form a starting point of the logical vector. The second point on the logical vector is the first skimmer formed by the critical throat 616 on the inverted V-point 618, while the third point is a second skimmer formed by the second critical throat 518 of the apex skimmer 524 skimmer. The logical vector formed in this manner is substantially aligned with a second vector drawn from the center of rotation of the rotor shaft 102.

A disk cover plate 202 is shown in FIG. 8 and is used to enclose the centrifuge rotor disk 108. That is, the disk cover plate 202 is a circular plate 812 having a diameter approximately equal to the diameter of the base and second skimmer ring 216 and has a central opening 804 sized for receiving the outer surface of the central hub 123. A first recessed portion 806 in the top surface 203 (see FIG. 2) is sized and shaped to receive the nozzle ring 212 such that the disk cover plate 202 encloses the nozzle ring 212 when in place on the centrifuge rotor system 108. A second recessed portion 808 in the top surface 203 is sized and shaped to receive the first skimmer ring 214 such that the disk cover plate 202 encloses the base and first skimmer ring 214 when in place on the centrifuge rotor system 108. Similarly a third recessed portion 810 on the top surface 203 is sized and adapted to receive the base and second skimmer ring 216. Then a disk cover plate 202 is bolted or welded to the base and second skimmer ring 216 by conventional means.

Figure 4:
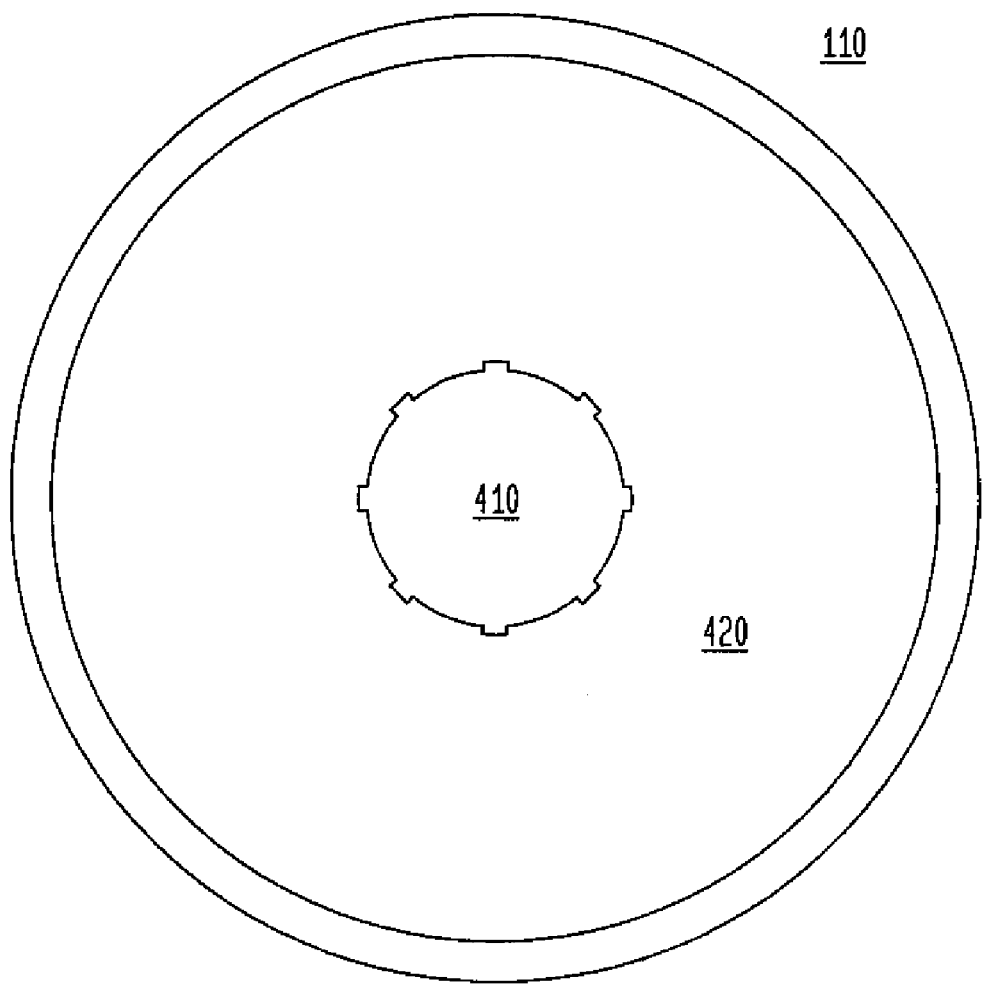
FIG. 4 is a top view of an outlet manifold.

An embodiment of a collection manifold 110 is shown on FIG. 4. The collection manifold 110 has a circular housing that is open on the top end 262 and has a bottom surface 420 on the bottom end 260 (see FIG. 2). The bottom surface 420 has an opening 410 that is centrally located and sized for receiving the central hub 123, and when the collection manifold 110 is installed with the central hub 123, the outlet gas ports 224 fabricated into the central hub 123, so that light species enriched gas that enters the collection manifold from the first gas vents 624 and second gas vents 510 flow into the outlet gas ports 224, turn 90° and outlet the central hub 123 through outlet gas ports 225.

Figure 9:
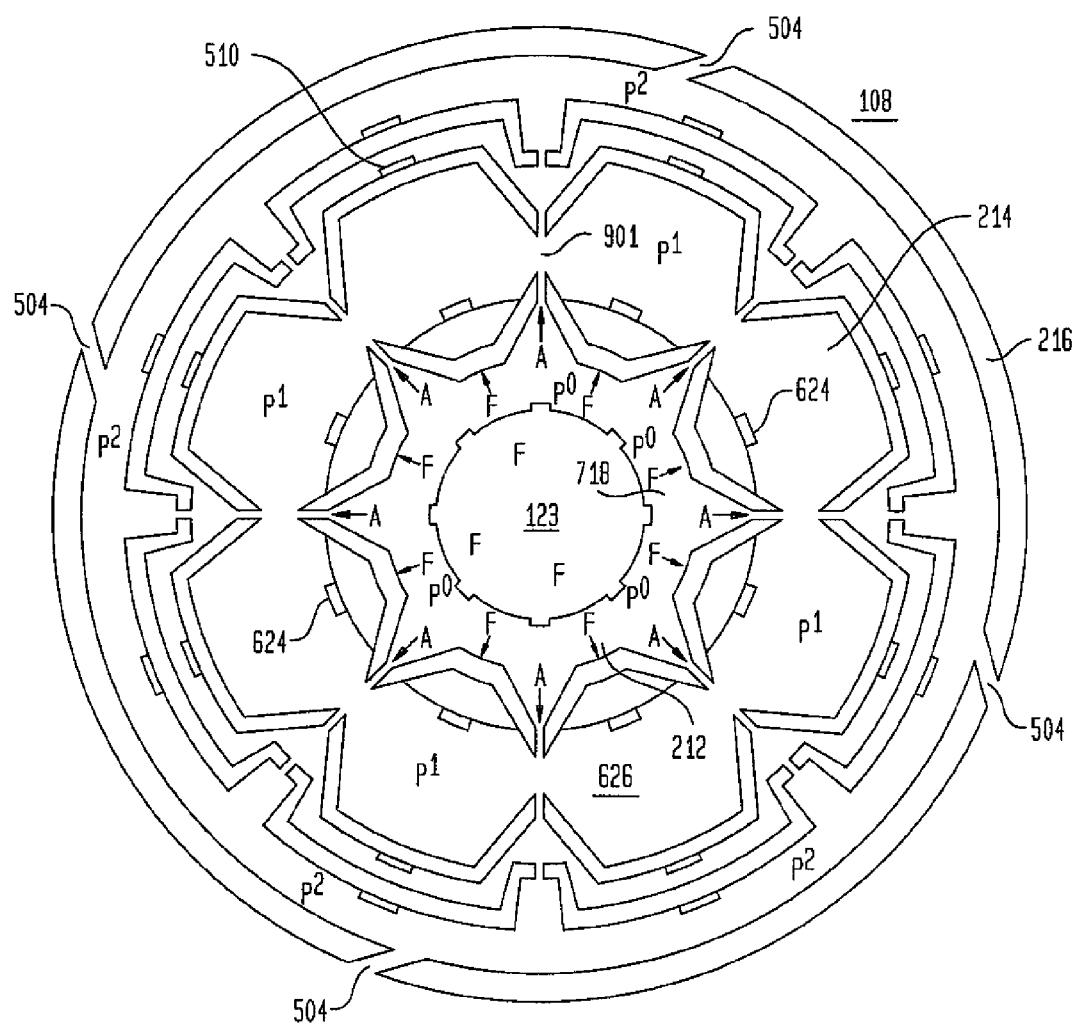
FIG. 9 is a top view of a centrifuge rotor system.

The gas flow passage through the centrifuge rotor disk 108 is shown in FIG. 9. The inlet gas 118, also referred to herein as originating or contaminated gas, and depicted within the centrifuge rotor diagrams as "F", flows through the central hub 123 via gas port passages 219 and turns 90° to enter the nozzle ring 212 via gas ports 223. The inlet gas 118 enters the centrifuge rotor 100 at an elevated or high-pressure. The annulus chamber 718 is located between the gas ports 223 and the base of the convergent nozzles 702 of the nozzle ring 212. The annulus chamber 718 forms an pressure reservoir with a pressure $P^0$. The annulus chamber 718 pressure $P^0$ has the greatest gas pressure and lowest velocity of any point within the centrifuge rotor disk 108. Due to the pressure level within annulus chamber 718, $P^0$, the gas F is pressure driven through the convergent nozzles 702 of the nozzle ring 212, in direction A, to exit through nozzle throats 704 at a choked velocity. The nozzle throat 704 pressure $\acute{\eta}$ is $\acute{\eta}/P^0=0.528$, where the gas flow increases in velocity to mach by reduction of the pressure $P^0$ found in annulus chamber 718. This velocity transition of the flow through the nozzle throat 704 forms a compact gas beam aimed at the first gas skimmer critical throat 616. As used herein, the term "gas beam" is used at various times to describe a jet or other ejection of a gas core from a nozzle or opening in a specified direction. The first gas skimmer critical throat 616 is separated from the nozzle throat 704 by the skimmer offset 901, which is the distance between the nozzle throat 704 and the skimmer critical throat 616. The skimmer offset 901 expands into formed stagnation zones in the chambers 626 that are maintained at a pressure $P^1$. The ratio of the chamber 626 pressure $P^1$ to the original pressure $P^0$ is about 0.15 to about 0.20. The pressure $P^1$ level is maintained by the chamber 626 volume and the volume of the collection manifold 110. The pressure $P^1$ affects the compact gas beam between nozzle throat 704 and skimmer critical throat 616 by not allowing the compact gas beam at mach or near mach velocity to fully expand into a free gas flow.

As apparent to one of ordinary skill in the art, the pressure $P^1$ is modulated by the overall fluid path design of the centrifuge rotor 100 and the total vacuum or pumping capability of the gas pump 1007. For example, in one embodiment if the pressure $P^1$ is reduced (i.e. the ratio is at the lower end of the range and the difference between $P^0$ and $P^1$ is the greatest, the velocity of the velocity is the greatest, the shock structures formed at the skimmer critical throat 616 are the greatest and the spread or deflection of the inlet gas 118 jet is the greatest. In this manner, the separation effect is greater thereby encouraging the separation of particles more closely related in scale. In a similar manner, the smaller the ratio between $P^0$ and $P^1$, results in the smallest deflection, shock structures from impinging the skimmer critical throat and narrowest spread of the inlet gas resulting in enhanced throughput and a greater fraction of the overall inlet gas 118 entering into the skimmer critical throat 616. One of ordinary skill in the art is able to adjust the performance of the separation rotor 100 by adjusting the pressure ratios between $P^0$ and $P^1$ to enhance the separation of the constituent particles or species present in the inlet gas 118 to achieve various separation goals without other changes to the hardware system.

The on-coming gas to the skimmer critical throat 616 experiences a pressure-front due to the restriction of the critical throat 616 wherein flow entering the critical throat 616 is recompressed to a choked velocity and stagnation pressures so that $P^0 > P_{stag}$, and $P_{stag} > P^1$, and on-coming gas to the skimmer critical throat 616 that is physically outside the dimensions of skimmer critical throat 616 is deflected by the two side walls 612, 614 into the bordering stagnation zones formed in the chambers 626, where pressure is maintained in a range of about 0.15 to about 0.20 of original pressure $P^0$, and gas is vented from the stagnation zones formed in the chambers 626 via first gas vents 624 into the collection manifold 110 and eventually outlets the outlet gas ports 225 outside the centrifuge rotor 100 as a fraction of the light specie enriched fraction i.e. the light specie enriched fraction 122. The remainder of the compact gas flow that does enter the critical throat 616 is returned to mach velocity in the critical throat 616, and the same phenomenon occurs between critical throat 616 and second critical throat 518 located as part of the base and second skimmer ring 216. That is, some of the compact gas jet is deflected from the core flow into the second stagnation zone formed in the chamber 626 and is vented to the collection manifold 110 and the core of the gas jet enters the second critical throat 518, which then exits the centrifuge rotor disk 108 from vents at the periphery of the centrifuge rotor 100 as the light specie depleted fraction 120.

In the embodiment just described, the fractioning of the initial inlet gas 118 into two separate gas flows, the light specie enriched fraction 122 and the light specie depleted fraction 120 occurs by the concentrated core flow of the high velocity compact gas beam entering the skimmer critical throat 616. This process is controlled in a manner of speaking, by physically allowing a majority of the overall gas beam to pass through the skimmer critical throat 616 and second critical throat 518, while deflecting a minor flow. In a normal operation, about 60% to about 80% of the whole gas flow is concentrated and enters and compressed through skimmer critical throat 616, while about 20% to about 40% of the whole gas flow through the nozzle throat 704 is deflected and is separated from the whole gas flow. Additionally, the portion of the whole gas flow concentrated in critical throat 616 expands toward the second critical throat 518 where about 60% to about 80% of that gas fraction is concentrated, enters and is compressed through second critical throat 518, while about 20% to about 40% of the gas passing through the second critical throat 616 is deflected and separated. In this manner overall, the light specie depleted fraction 120 contains between about 36% to about 64% of the original flow of inlet gas 118, and the heavy specie depleted gas 122 contains the remainder of the flow, calculated to be the flow balance by pure mechanical separation of the flow.

In one embodiment of the separator device, the centrifuge rotor 100 is powered by in-line pumps or turbines to form a self-powered centrifuge rotor 1000 depicted in FIG. 10. In this embodiment, the self-powered centrifuge rotor 1000 is coupled with drive components and drive and pump components adapted to use the high-pressure inlet gas 118 to spin a drive turbine that spins the centrifuge rotor disk 108 and drives a gas pump 1018. The embodiment of the self-powered centrifuge rotor 1000 details a component array including centrifuge rotor disk 108 and a centrifuge skimmer housing 1013, an upper high-pressure gas drive, referred to as the gas drive 1017, and gas pump 1018.

As depicted, the gas drive 1017 includes several components that when assembled, provides a high-pressure gas motor that receives high pressure gas, entering the self-powered centrifuge rotor 1000 from a pipeline and converts the high-pressure energy of the gas to rotational motion and transmits that rotation to the centrifuge rotor disk 108. The gas exiting the gas drive 1017 enters the centrifuge rotor 100 as inlet gas 118. In its assembly, the gas drive 1017 includes an impeller 1006 rotatably coupled to the rotor shaft 102. The impeller 1006 is housed within the gas drive stator 1002 that comprises an upper end cap 1001 adapted to accept the incoming air and a drive flange 1014.

The depicted embodiment of the self-powered centrifuge rotor 1000 includes a gas pump 1018 with a gas pump impeller 1007 rotatably coupled to the rotor shaft 102. In this manner the incoming air imparts a rotational velocity to the gas drive 1017 that in turn urges the rotation of the rotor shaft 102. The rotation of the rotor shaft 102 in turn causes the rotation of the centrifuge rotor disk 108 and the gas pump 1018. The gas pump impeller 1007 is adapted to interface with the pump stator 1003 that in turn has both a pump end cap 1010 and a pump flange 1015.

Figure 11:
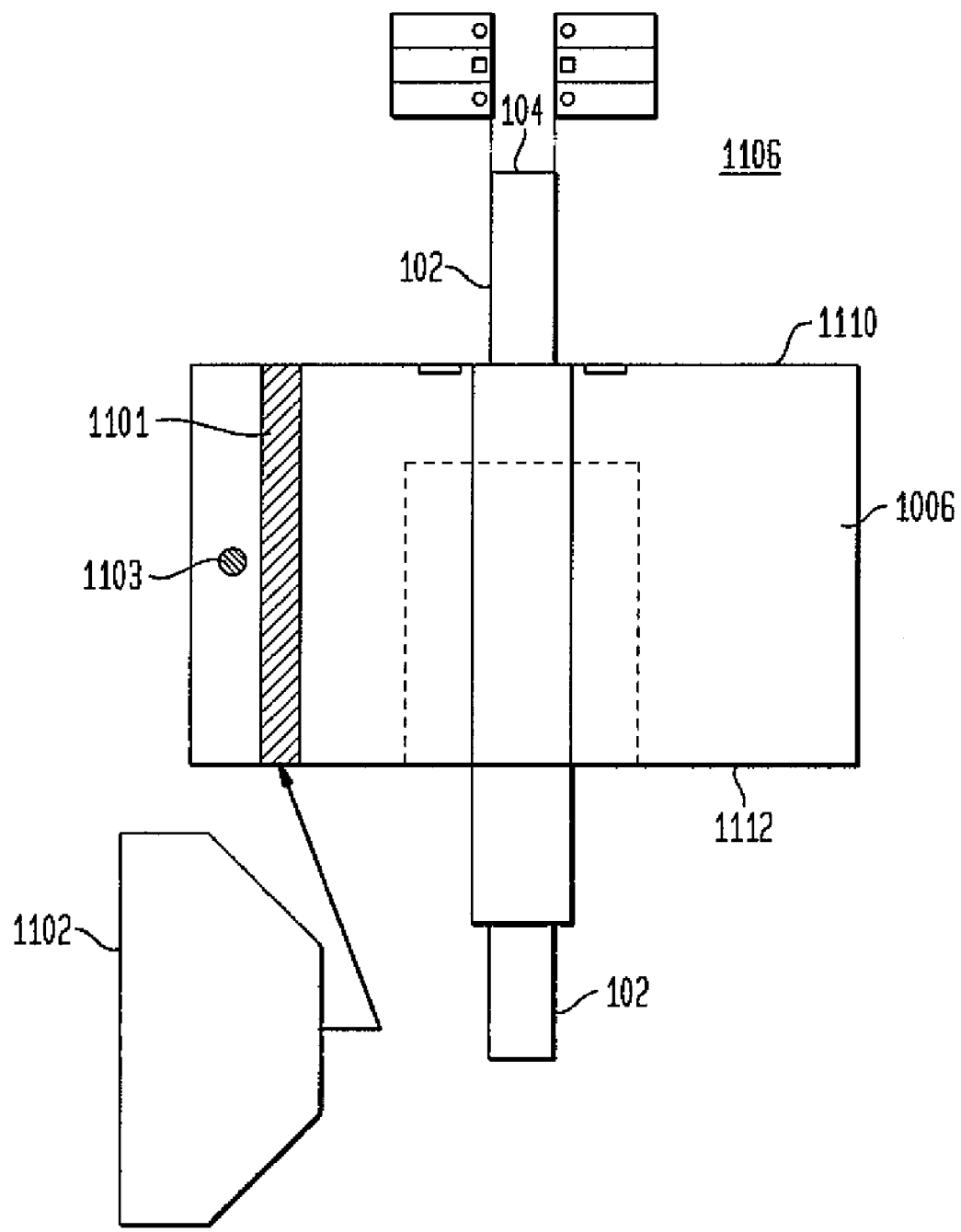
FIG. 11 is a side view of the drive motor.

The gas drive 1017 and gas pump 1018 that include the gas drive impeller 1006 and gas pump impeller 1007 respectively are similar in structure and operation. For simplicity, only the gas drive 1017 elements are depicted in FIG. 11. As apparent to those of ordinary skill in the art, similar elements are adapted to use with the gas pump 1018. The gas drive impeller 1006 in the embodiment depicted is substantially cylindrical in shape and includes multiple vanes 1102 that are fitted into multiple vane channels 1101. The gas drive impeller 1006 is rotatably coupled to the rotor shaft 102. The rotor shaft 102 on the inlet side end 104 is adapted to mate with rotary bearings 1106. The rotary bearings 1106 that should be moderate speed, high radial torque in design, and may be either lubricated or non-lubricated.

The vane channels 1101 are cut into the gas drive impeller 1006 and gas pump impeller 1007 depth-wise, about three-quarters of the radius and extend from the impeller top surface 1110 to the impeller bottom surface 1112. In the embodiment depicted, the vanes 1102 are the length of the depth of the vane channels 1101, and similarly extend from the top surface 1110 to the bottom surface 1112. Preceding each vane channel 1101 is a angled gas vent 1103 that extends from the peripheral surface of the gas drive impeller 1006. The purpose of the gas vent 1103 is adapted to hold the vanes 1102 in a substantially fixed relationship with the inner surface of the stators 1002 and 1003 respectively.

Both the gas drive impeller 1006 and the gas pump impeller 1007, referred to generally herein as "impellers" are intended to rotate within the drive stator 1002 and the pump stator 1003, referred to generally herein as "stators" respectively. The impellers 1006 and 1007 are positioned in their respective stators 1002, 1003 in an offset position, so that the position of the impellers 1006, 1007 have a narrow clearance and a wide clearance in relation to the stators 1002, 1003. In the embodiment depicted, the ratio of stator 1002, 1003 chamber diameter to impeller 1006, 1007 diameter is approximately 1.13. In this embodiment, the inlet of a gas into the system is at the wide clearance area and the outlet of a gas is in the narrow clearance area, and the vanes 1102 when installed in the vane channels 1101 are in constant contact with the inner surface of the stators 1002, 1003 when the impellers 1006, 1007 are in a rotation mode. Further, the vanes 1102 keep volumes of gas during the rotation separate from preceding gas and following gas by acting as a constant seal against the stator 1002, 1003 inner surface.

The interface between the vanes 1102 and the stator 1002, 1003 inner surface is selected by one or ordinary skill in the art to minimize frictional losses in the contact between the surfaces while promoting longevity of the vanes 1102 and the stator 1002, 1003 inner surfaces while still providing a fluidic seal. To achieve these goals, a person of ordinary skill in the art will use different combinations of materials to fabricate the vanes 1102 and the stator 1002, 1003 inner surfaces, including, without limitation, high-density poly-ethylene, nylon, polytertaflouroethylene (PTFE or Teflon), composite materials such as fibre reinforced versions of the prior polymers or metals such as impregnated bronze to provide just a few select examples. In another embodiment, the vanes 1102 are spring loaded to urge the vanes 1102 through the vane channels 1101 against the stator 1002, 1003 inner surfaces.

Figure 12:
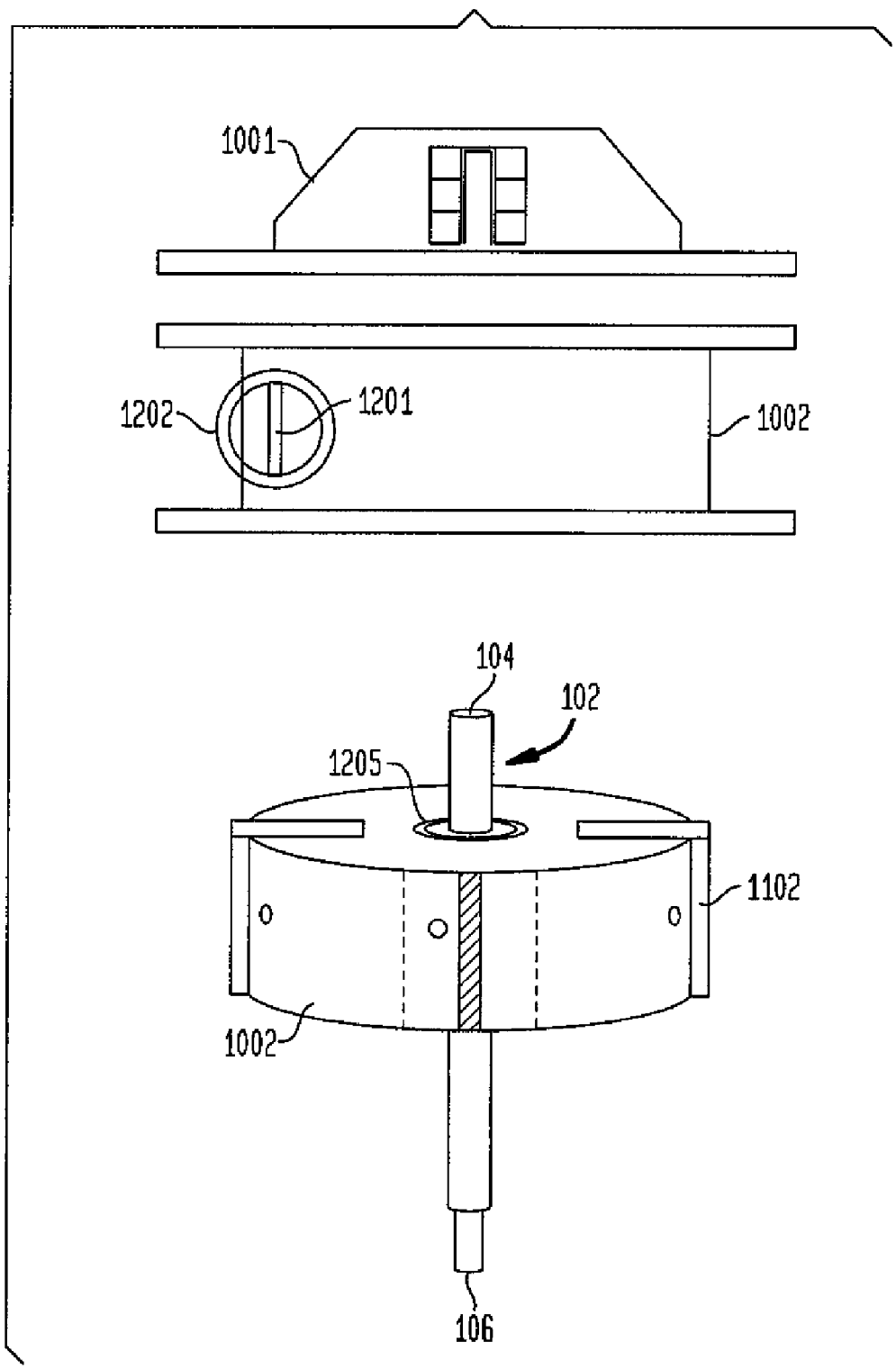
FIG. 12 is a perspective view of the drive motor and housing assembly.

The gas drive 1017 depicted in FIG. 12 in a disassembled schematic details the drive impeller 1006 installed in its offset position within drive stator 1002, and the drive stator 1002 having a tangential gas inlet 1202 through which the pressured gas 1201 enters the drive stator 1002 to impinge on the drive impeller 1006, and by pressure-torque causes the drive impeller 1006 to rotate. It is also shown that the inlet side end 104 of the rotor shaft 102 installs into the rotary bearings 1106 that in turn are mounted on the upper end cap 1001, and the lower shaft end 1008 similarly installs through the central hub 123 and into the central section of the rotor drive shaft 102. It is also shown that the upper end cap 1001 is fastened to the flange 1014 of the stator 1002 and the lower end cap 1010 fastens to the pump flange 1015 of the stator by any suitable fastening method, so that the mentioned parts constitute an operational device, and so that the impeller 1006 is within the confines of the stator 1002 in a offset position. The gas drive device 1017, has a gas-space annulus is formed between the drive impeller 1006 offset in the drive stator 1002, and that the widest portion of the gas-space annulus is in the vicinity of the gas inlet 1202 and that the narrowest portion of the gas space annulus ends before the gas inlet 1202. It can be seen that the pump exhaust outlet 1205 is a series of gas ports on the top surface of the impeller 1006. As gas is circulating through the gas annulus from its widest portion to its narrowest portion, the gas is forced through the gas ports by the rotating impeller 1006 and its vanes 1102, exhausting the gas from the gas drive 1017. This exhaust gas is directed to the central hub 123 for inlet into the gas centrifuge rotor disk 108. Thus, the pump exhaust outlet 1205 is fluidicly coupled to the central hub 123 and the inlet gas 118 emerges from the gas drive 1017 via the pump exhaust outlet 1205.

In an alternative embodiment, the gas drive 1017 is replaced by an inlet pump thereby enabling the separation device to be used with inlet gases that are not pressurized (i.e. the pressure of the inlet gas 118 is not sufficient to drive the inlet gas 118 through the centrifuge rotor disk 108 or other elements in the flow path through the separation device let alone being sufficient to turn the gas drive 1017. In these cases, the inlet pump is affixed to the system to pump or draw in the inlet gas 118, and increase the pressure of the inlet gas 118 so the pressure of the inlet gas 118 in the central hub 123, the centrifuge rotor disk 108 and other elements of the separation device hold the inlet gas 118 or other separated gases at higher pressures. In this manner, the separation device may operate under a variety of conditions where the flow of the inlet gas 118 to be separated is either not sufficient or varies below the minimum pressure required to operate the separation device. In one of these embodiments, the pump is rotated by the same external torque generator, as further described herein, used to drive the rotor shaft 102 and the other rotary components of the separation device. In an alternative embodiments an external pump is used that is substantially detached or separated from the rotor shaft 102, such that the pumping action occurs independent of the rotation of the rotor shaft 102 using a separate power or energy source and the pressured inlet gas 118 is supplied to the separation device via means known to those or ordinary skill in the art.

As understood to those of ordinary skill, the gas pump 1018 operates similarly is to a gas drive device 1017, however rather than having a rotational moment imparted from the incoming air, the gas pump 1018 is rotateably coupled to the rotor shaft 102 and pumps the working gas from the centrifuge rotor disk 108 and exhausts it from the separator device. In this regard, the previous description generally describes the operation of the gas pump 1018, with the reversal of operation being the gas inlet 1202 for the pressurized gas 1201 entering the gas pump 1018 is brought in through the gas exhaust ports 1205 from the central hub 123 and into the annulus between the impeller 1006 and the stator 1003, and the gas exhaust for the gas pump is through the tangential gas inlet 1202 of the stator 1003.

Figure 13:
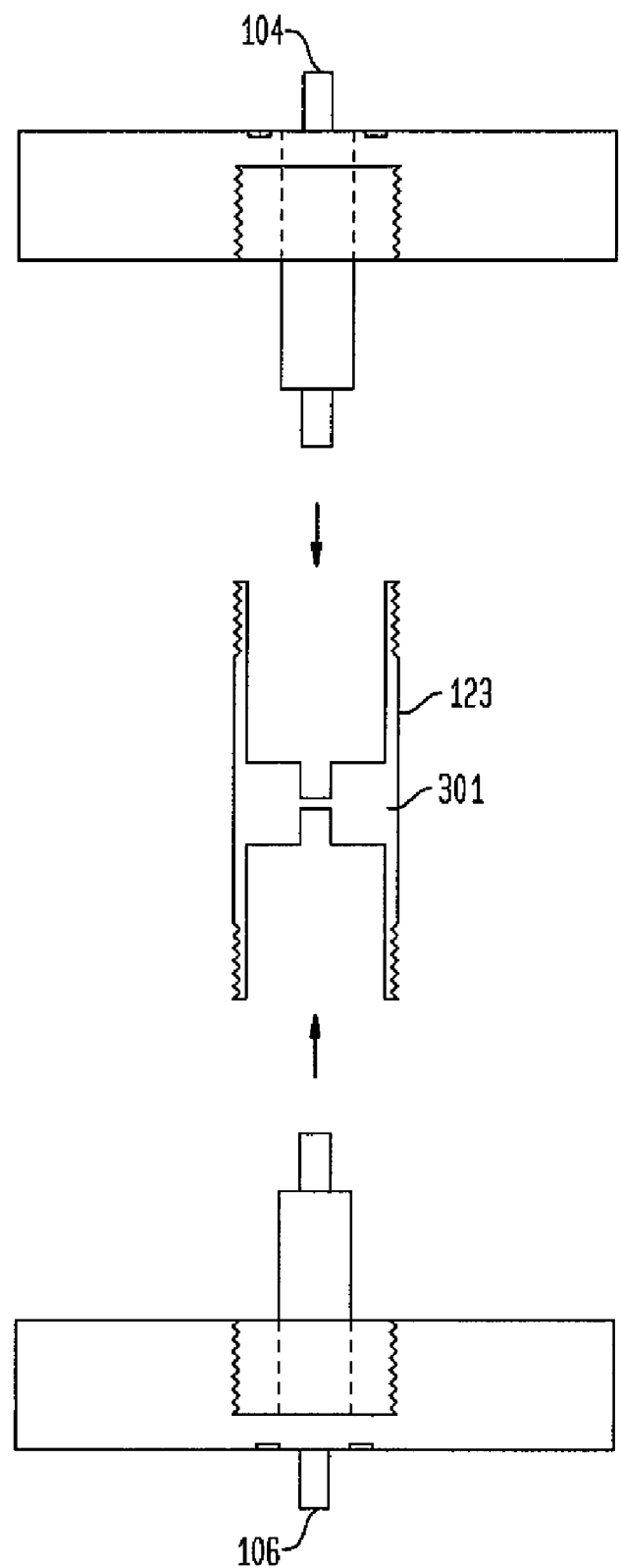
FIG. 13 is a side view of the central hub and drive motor and gas pump.

Both the gas drive device 1017 and the gas pump device 1018 are integrated to the centrifuge rotor device 100 and rotatably linked via the rotor shaft 102 by their attachment of the inlet side end 104 of the gas drive 1017 and the upper shaft 1011 of the gas pump 1018 into the rotor shaft 102 by means of the barrier piece 301 (see FIG. 13) of both the gas drive device 1017 and the gas pump device 1018. In this attachment method, the gas drive 1017, the centrifuge rotor disk 108, gas pump 1018, and the central hub 123 are connected mechanically to rotate, such as in a clockwise direction, as a single unit, driven by the gas pressure and volume of the inlet gas 118, and have a single gas path where inlet gas 118 powers the gas drive device 1017, is exhausted into the centrifuge rotor device 100 via the central hub 123, where the inlet gas 118 is fractioned into a light specie depleted fraction 120, also described in the alternative as the light specie depleted mass fraction or the heavy enriched gas fraction, that is exhausted from the centrifuge rotor device 100, and the light specie enriched fraction 122 is exhausted from the centrifuge rotor device 100 into the gas pump 1018 for final outlet to the pipeline (not shown).

The embodiment depicted is adapted for use with natural gas, and thus the heavy specie depleted or light species enriched fraction 122 is collected and output via the gas pump 1018 since the light specie enriched fraction 122 of the inlet gas 118 is the desired portion of the gas stream. In other embodiments, the light specie depleted fraction 120 is collected for further processing.

Figure 14:
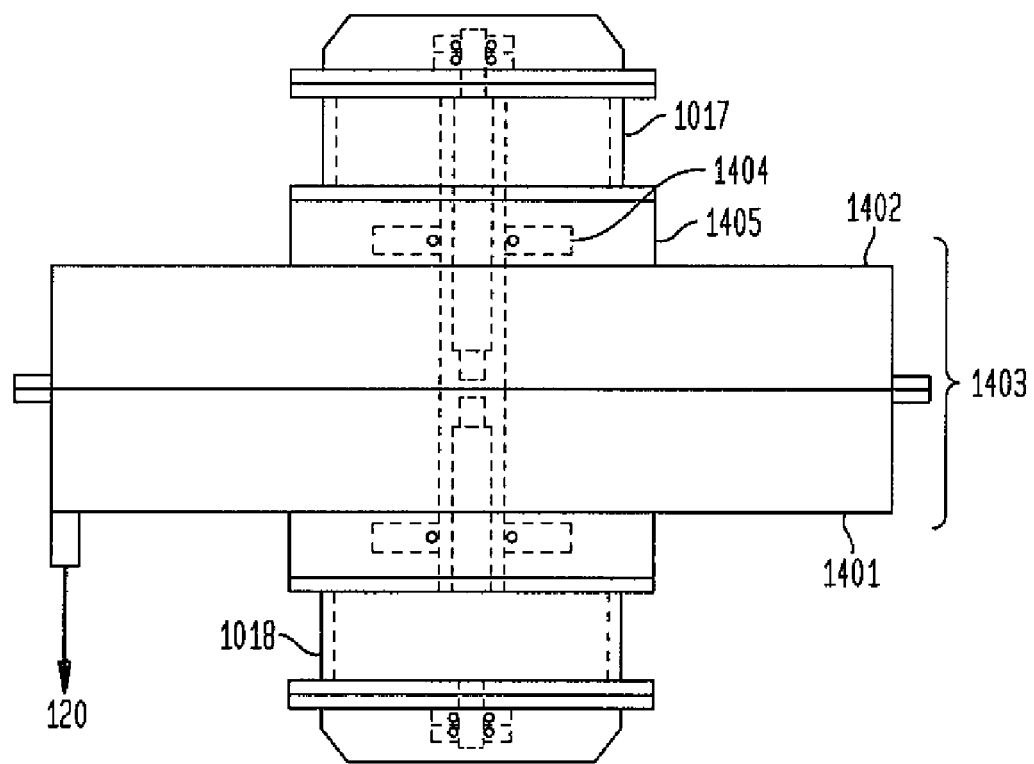
FIG. 14 is a side view of the centrifuge housing assembly, with assembled drive motor and gas pump components.

The centrifuge rotor housing 1403 and gas drive 1017 and gas pump 1018 are depicted in FIG. 14. It can be seen that the gas inlet 118 enters the gas drive device 1017, flows to the central hub, flows to the centrifuge rotor 100 (not shown in FIG. 14), and is fractionated into the light species enriched fraction 122 that leaves the centrifuge through the gas pump device 1018, and the light species depleted fraction 120 (i.e. heavy component) that leaves the centrifuge through the lower housing half 1401. The centrifuge housing 1403 includes the upper housing half 1402 and the lower housing half 1401, with both halves joined around the perimeter by bolts or welds. The gas drive 1017 mounts to the upper housing half, and that the gas pump device 1018 mounts to the lower rotor half 1401 by either bolts or welds via the drive flange 1014 and the pump flange 1015. In their attachment, the gas drive device 1017 and the gas pump 1018, both extend through a central opening in their respective housing halves by virtue of their lower end caps that have a central pipe extension 1405 that houses the radial bearing assembly 1404.

Figure 15:
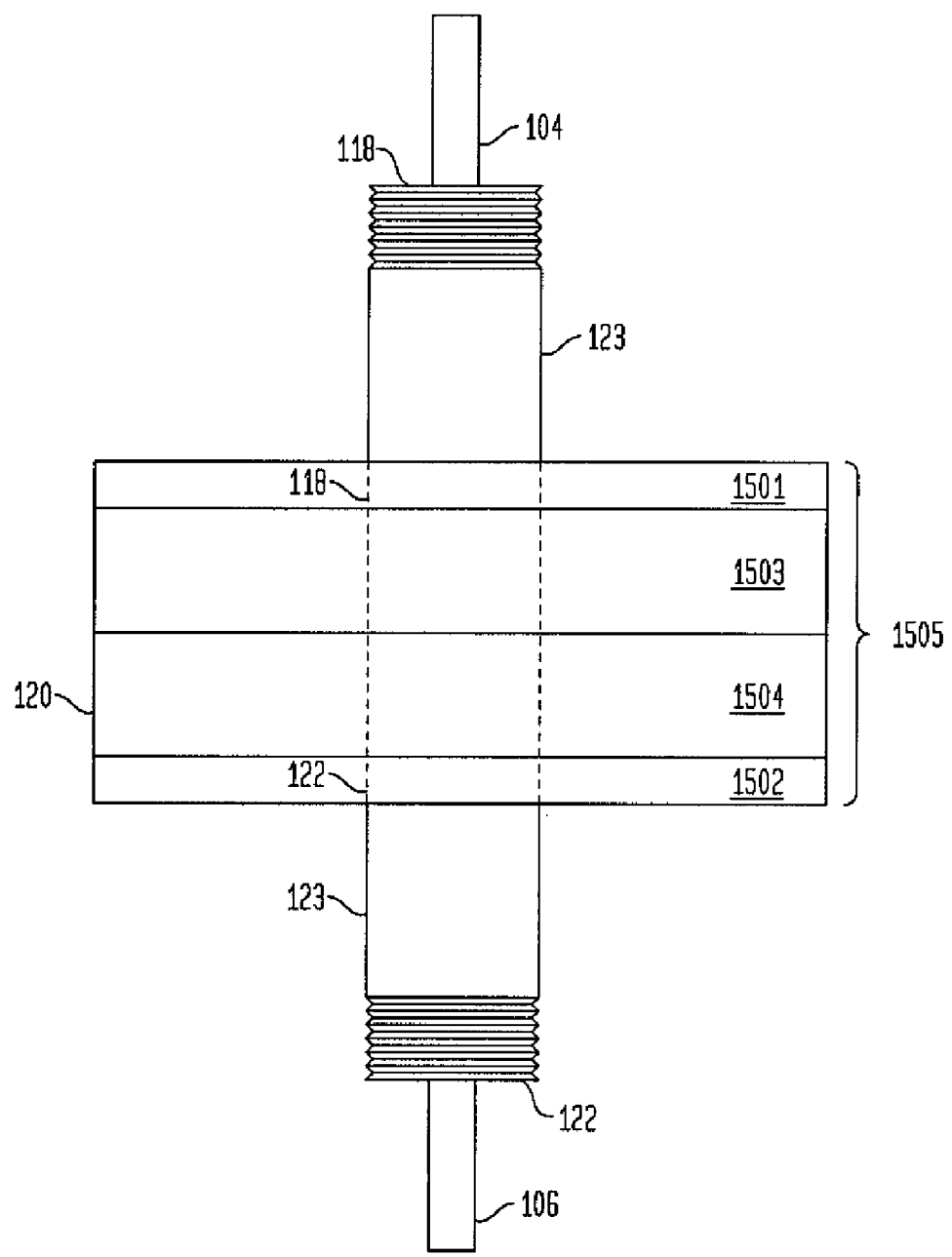
FIG. 15 is a side view of the centrifuge rotor assembled to the central hub.
Figure 16:
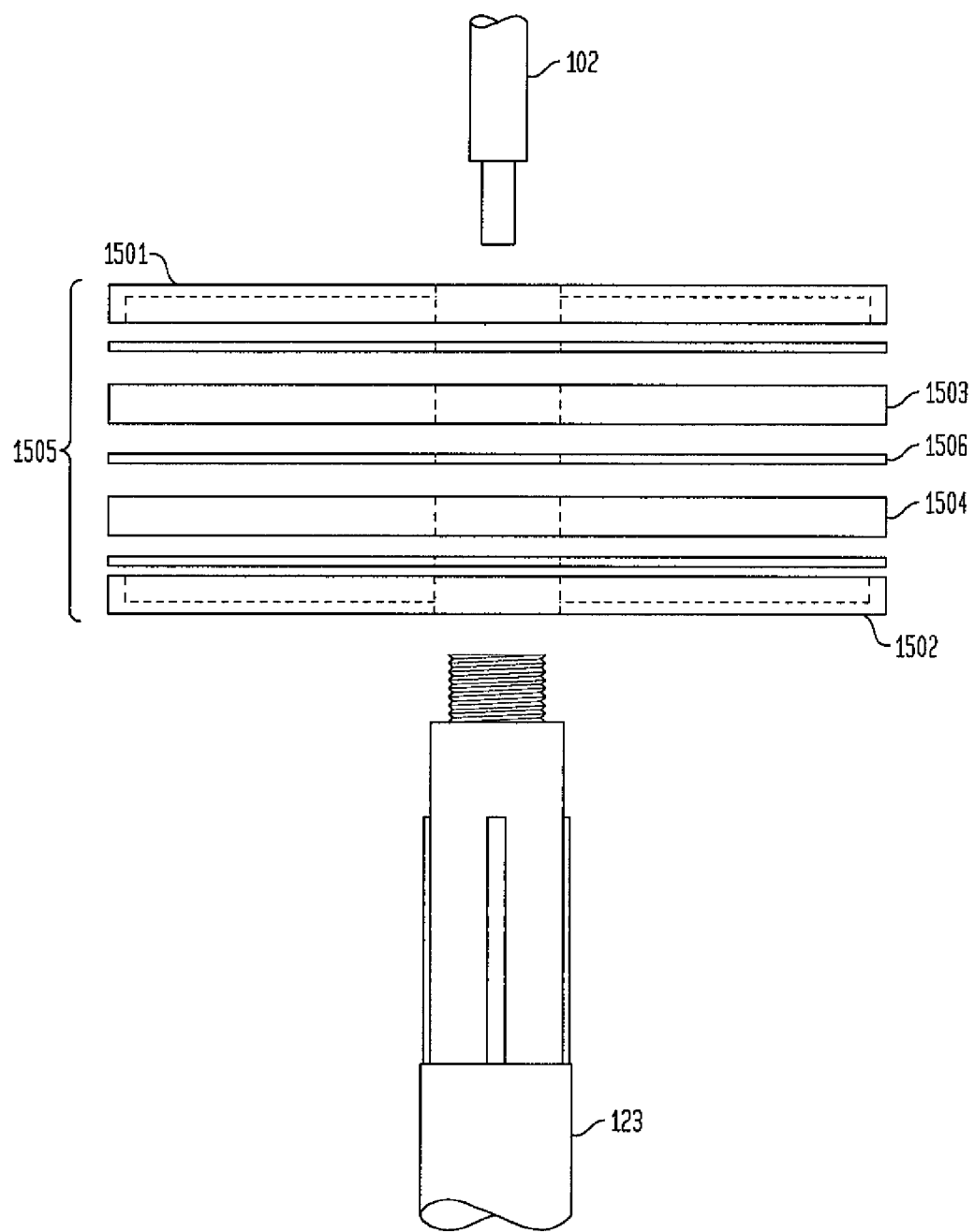
FIG. 16 is an expanded side view of the individual rotor plates, the central hub, and the upper drive shaft.

As embodied herein and illustrated in FIG. 15 and FIG. 16, a second embodiment of a centrifuge nozzle separator 1500, such that an inlet gas 118 is introduced into the centrifuge rotor 1500 and the centrifuge rotor 1500 separates the inlet gas 118 into a light specie depleted fraction 120 and a light fraction or light specie enriched gas 122. The centrifuge nozzle separator 1500 is an embodiment of the centrifuge rotor 100 comprising a curved nozzle assemblage that includes an acceleration nozzle, a stagnation zone, a skimmer, and a diffuser, as detailed below.

As shown in FIG. 15 in schematic form, the centrifuge nozzle separator 1500 has a central hub 123 on which the centrifuge rotor system 1505 is mounted by attachment means such as thermal press-fitting between the central hub 123 and the centrifuge rotor system 1505. The centrifuge rotor system 1505 includes sub-parts; upper end plate 1501 and lower end plate 1502, both referred to herein as "end plates". The centrifuge nozzle separator 1500 further comprises an inlet curved nozzle plate 1503 and an outlet curved nozzle plate 1504, both referred to herein as "curved nozzle plates" 1503, 1504 and manifold plate 1606 (shown in FIG. 16). The assemblage of the components as depicted in FIG. 16 is similar to the depiction in FIG. 2, although as shown in FIG. 16, the assemblage is in a sandwich-fashion where the inlet curved nozzle plate, 1503, manifold plate 1606, and the outlet curved nozzle plate 1504 are assembled between upper and lower end plates 1501, 1502 and the assembled component 1505 is thermal press-fit to the central hub 123, with the rotor shaft 102 fitted into the central hub 123.

Figure 17:
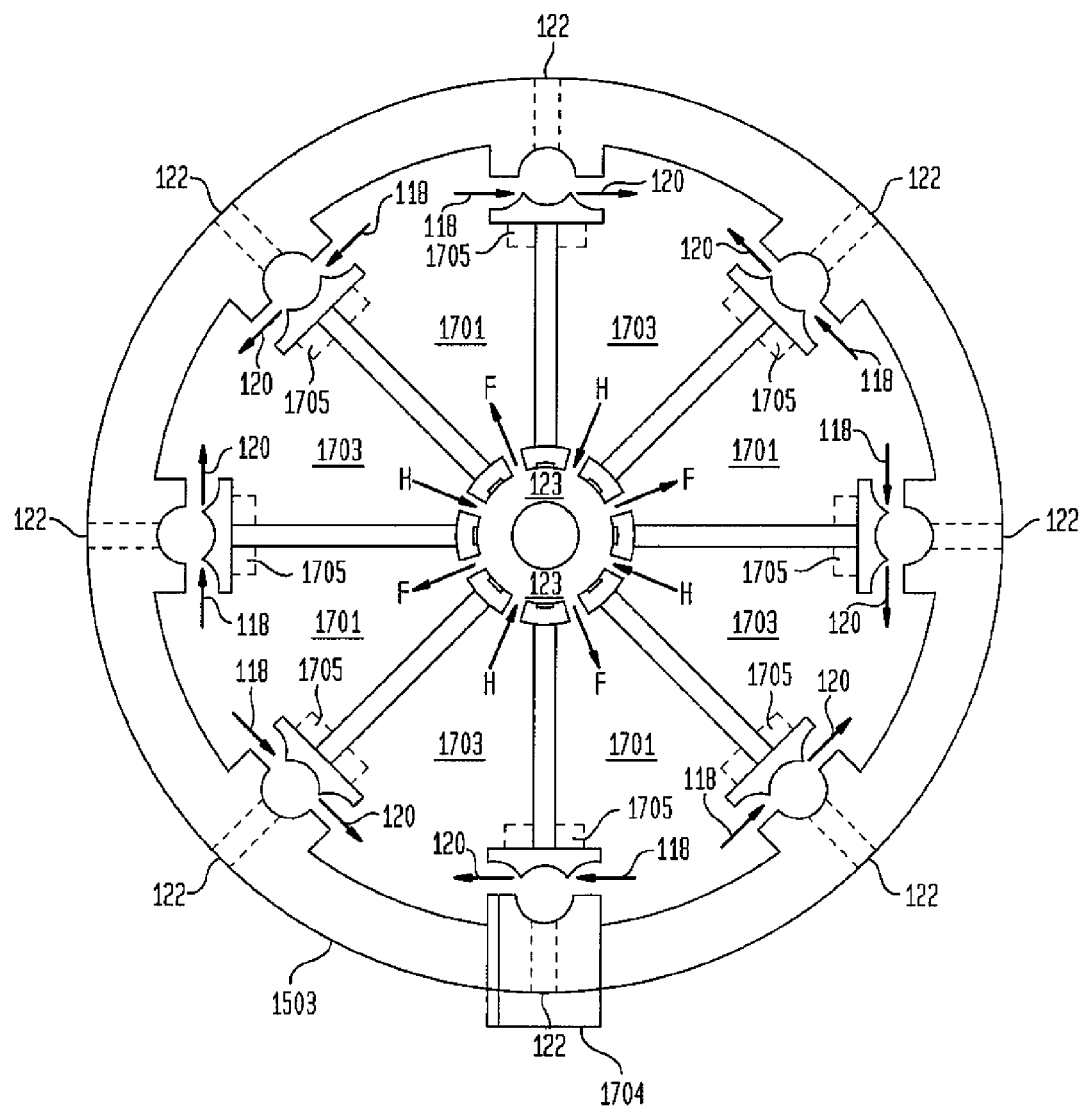
FIG. 17 is a top view of the curved nozzle plate with curved nozzle assemblies.
Figure 19:
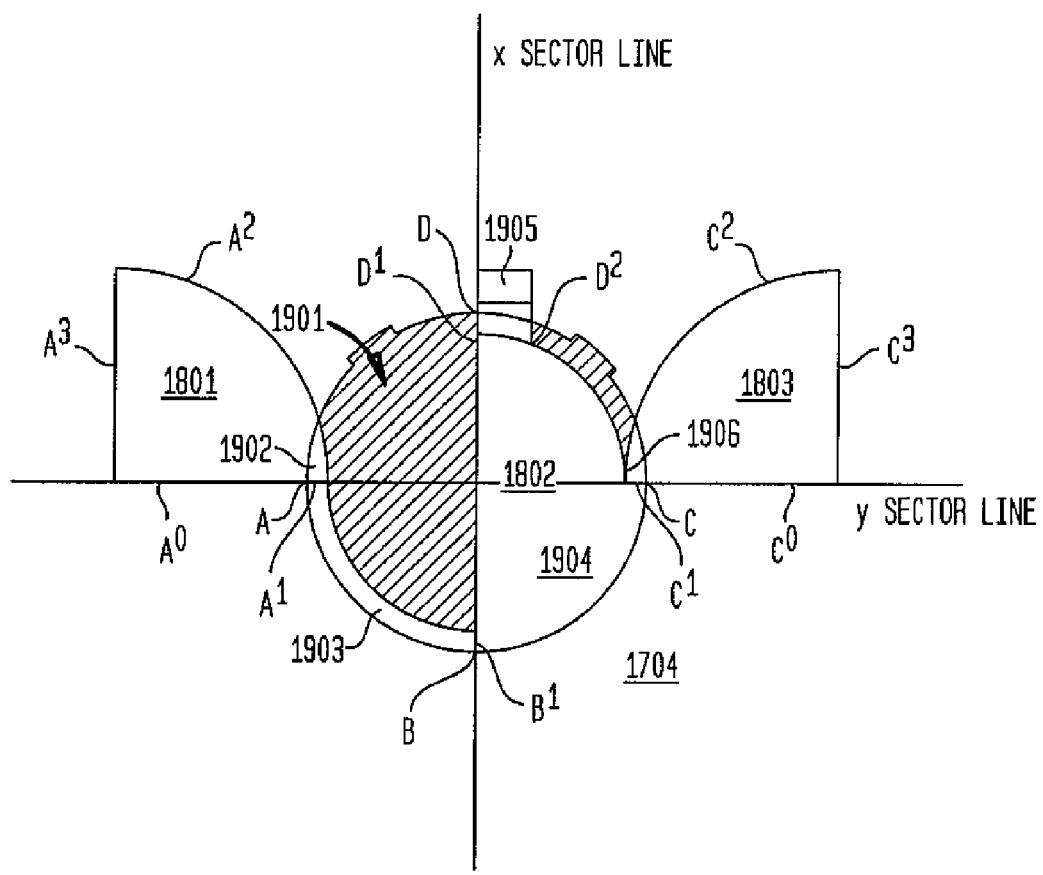
FIG. 19 is an exploded, top view of the curved nozzle components.

The embodiment as shown in FIG. 17 details the curved nozzle 1704, further detailed in FIG. 19, around the perimeter of the inlet curved nozzle plate 1503. In communication with each curved nozzle 1704 there is an inlet reservoir 1701, a light fraction reservoir 1705, and a heavy fraction reservoir 1703. The curved nozzle 1704 is fabricated into the inlet curved nozzle plate 1503 so that the depth of the cut of curved nozzle 1704 into the inlet curved nozzle plate 1503 determines the volume of gas that passes through the curved nozzle 1704, subsequently, the depth of the inlet reservoir 1701 and the heavy fraction reservoir 1703 is at the same depth of cut as the curved nozzle assembly 1704. It should be understood that the light fraction reservoir 1705 is fabricated into the manifold plate 1606 directly under the inlet curved nozzle plate 1503 and the light fraction or light specie enriched fraction 122 enters the light fraction reservoir 1705 through a light enriched outlet port 1905 (see FIG. 19) in the curved nozzle 1704. The embodiment in FIG. 17, details eight curved nozzles 1704 arranged around the perimeter of the inlet curved nozzle plate 1503, other embodiments possess more or less curved nozzles 1704, depending on the application.

The selection of the curved nozzle 1704 geometry for given applications is driven by several factors, including the desire for specific throughput and separation factors. The type of separation process and constituent particles to be separated are also factors in the selection of the curved nozzle 1704 geometry. For example, if the particles to be separated are two gas species with substantially no condensation intended or actually occuring or substantially no solid particles, then separation performance of the curved nozzle 1704 geometry is driven primarily by the overall velocity through the curved nozzle 1704. The relative ratio between the nozzle throat $A^1$ dimension and the nozzle divergent outlet width $B^1$ dimension is about 1.7 ($A^1/B^1$=~1.7). In contrast when the curved nozzle 1704 is optimized for condensing particles from the inlet gas 118, the relative ratio between the nozzle throat $A^1$ dimension and the nozzle divergent outlet width $B^1$ is about 4 ($A^1/B^1$=~4). In the case of the separation of particles that partially or wholly condense from the inlet gas 118 stream, the greater ratio between $A^1$ and $B^1$ causes the inlet gas 118 to expand rapidly, dropping pressure and encouraging the formation of condensate in the curved nozzle 1704 for removal. Using these design guidelines, one of ordinary skill in the art may adapt a curved nozzle 1704 to various particle separation goals.

For fabrication of the embodiment shown with eight curved nozzles 1704, four inlet reservoirs 1701 are fed inlet gas 118 from the central hub 123, and each inlet reservoir 1701 feeds inlet gas 118 into two curved nozzles 1704. As the inlet gas 118 processes through each curved nozzle assembly 1704, a heavy fraction, or light specie depleted fraction 120, is concentrated from the inlet gas 118 and a light fraction gas or light specie enriched fraction 122 is separated from the inlet gas 118. The light specie depleted fraction 120 outlets upon concentration into the heavy fraction reservoir 1703, with two curved nozzle assemblies 1704 feeding each heavy fraction reservoir 1703. The light fraction gas or light specie enriched fraction 122 separated from the inlet gas 118, enters the light fraction reservoir 1705 of each curved nozzle 1704, and is extracted through the periphery of the centrifuge rotor system 1505. The light specie depleted fraction 120 in the heavy fraction reservoir 1703 flows through a gas port (not shown), to enter a inlet gas reservoir 1701 of a outlet curved nozzle plate 1504, for continuing the same gas processing of the heavy fraction or light specie depleted fraction 120.

Thus, in operation as shown in relation to FIG. 14, when using the curved nozzle 1704 embodiment, both the heavy fraction (gas component) heavy fraction gas component, the light specie depleted fraction 120 and the light fraction or light specie enriched fraction 122 (gas component) are output as illustrated on FIG. 14. Also, operationally the curved surfaces of the curved nozzle 1704 embodiment accelerates the gas through the nozzle 1704 which in turn allows the centrifuge nozzle separator 1500 as a whole to rotate slower while still achieving a comparable separation level comparable to a higher rotation with slower acceleration.

Figure 18:
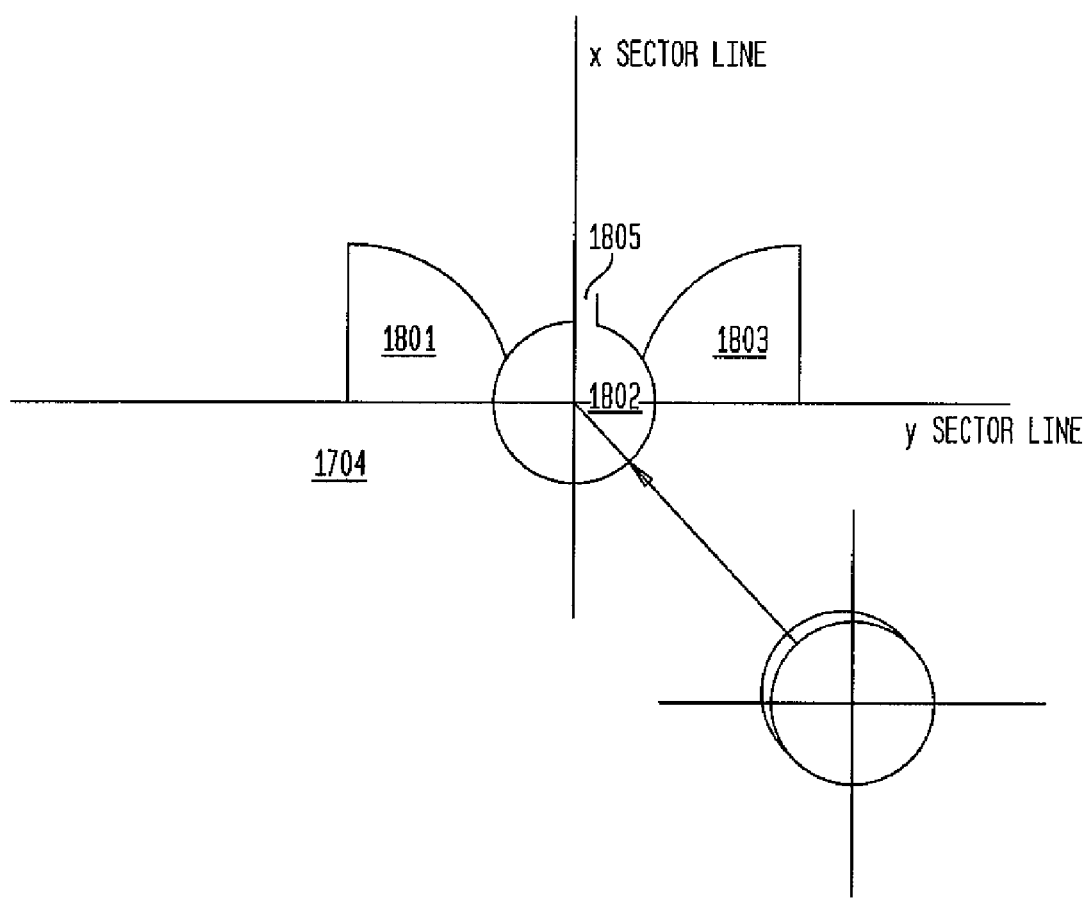
FIG. 18 is a top view of the curved nozzle bore and curved nozzle insert.

The embodiment depicted in FIG. 18 shows that a curved nozzle 1704 is fabricated by machining the inlet mouth 1801, the nozzle chamber 1802, the light depleted diffuser 1803, and the light enriched diffuser 1805 into the inlet curved nozzle plate 1503 and outlet curved nozzle plate 1504. As shown in FIG. 19, the nozzle insert 1901 is formed to be subsequently inserted, and preferably pressure fit, into the nozzle chamber 1802 after it has been machined to include a nozzle throat 1902, a divergent sector 1903 for a convergent-divergent nozzle, a stagnation zone 1904, a light enriched outlet port 1905, and a gas skimmer 1906. In the overall fabrication of a curved nozzle 1704, the nozzle chamber 1802, the inlet mouth 1801, the light depleted diffuser 1803, and the light enriched diffuser 1805, are machined into the curved nozzle plates 1503, 1504 so that the depth of those components are the same as the depth of the respective curved nozzle plates 1503, 1504. The divergent sector 1903 in the embodiment depicted in FIG. 19 is substantially concave in shape with a center of curvature oriented toward the center of the nozzle chamber 1802. The nozzle chamber 1802 is arranged in the curved nozzle plates 1503, 1504 so that its radial center line is the same as a radial line extending from the axis of rotation to the periphery of the curved nozzle plates 1503, 1504, this may be considered the x-sector line, depicted on FIG. 19 as "$x_{sector\ line}$." The y-sector line for the nozzle chamber 1802 is 90° from the x direction, shown in FIG. 19 as the "$y_{secftor\ line}$", so that the x-sector line and the y-sector line divide the nozzle chamber 1802 into four equal sectors. Additionally, the y-sector line forms the basis for aligning the inlet mouth 1801 and the light depleted diffuser 1803 to the nozzle chamber 1802. Further the x-sector line aligns the light enriched diffuser gas port, also referred to as the light enriched outlet port 1905 to the nozzle chamber 1802. Still referring to FIG. 19, locating points for the x sector line and the y sector line on the nozzle chamber 1802 perimeter are designated as points A, B, C, D, where A is a y-point, B is a x-point, C is a y-point, and D is a x-point.

In relation to the geometric designations of A, B, C, D of the nozzle chamber 1802, the nozzle insert 1901 is similarly designated with A, B, C, and D, so that when the nozzle insert 1901 is fitted into the nozzle chamber 1802, these locations are aligned. The nozzle insert 1901 has an outer diameter that adapted to the bore diameter of the nozzle chamber 1802, so that when insertion of the nozzle insert 1901 into the nozzle chamber 1802 a substantially tight fit is achieved. In one embodiment, a thermal interference fit is used, and the curved nozzle plates 1503, 1504 are heated, while the nozzle insert 1901 is cooled to allow the insertion of the nozzle insert 1901. After the nozzle insert 1901 is inserted, the entire assembly is cooled to room temperature. In this method, the nozzle insert 1901 is thermally press-fit into the nozzle chamber 1802.

Figure 20:
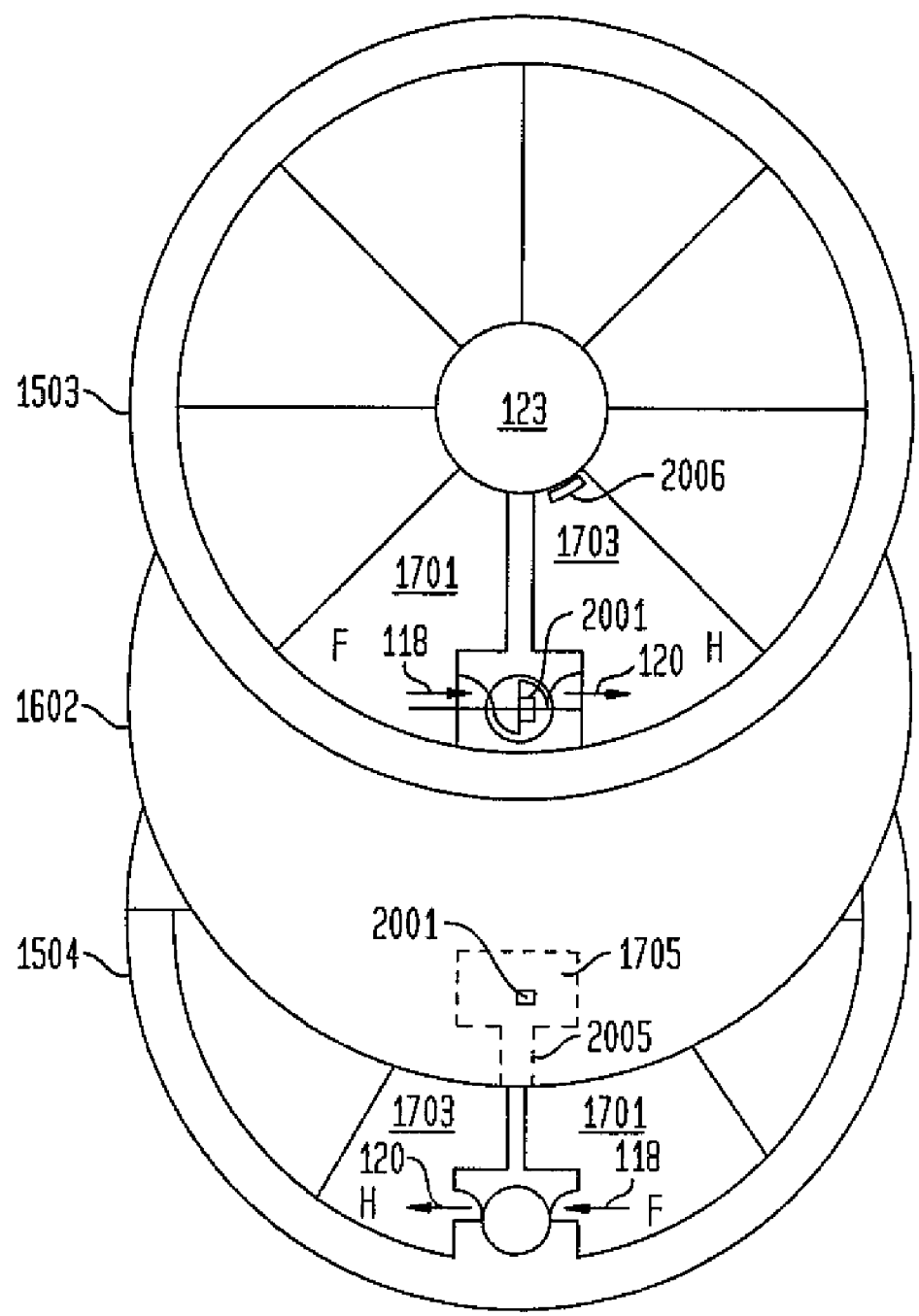
FIG. 20 is an exploded top view of the first stage curved nozzle plate, the manifold plate, and the second stage curved nozzle plate.

Prior to fitting the nozzle insert 1901 into the nozzle chamber 1802, the nozzle insert 1901 is machined to form the gas flow path through the curved nozzle 1704. Machining is performed to form the nozzle throat $A^1$ dimension, the divergent sector $A^1$-$B^1$, the stagnation zone $B^1$-$D^1$-$C^1$, and the skimmer throat $C^1$ dimension. As depicted in FIG. 20, the nozzle throat $A^1$ is formed into the nozzle insert 1901 by determining the desired nozzle throat $A^1$ width and marking that dimension from the perimeter of the nozzle insert along the A-C line. The curvature of the nozzle throat is then taken by the curved sector line $A^2$ from the inlet mouth 1801 that is extended into the nozzle insert 1901 and nozzle chamber 1802. This curved sector line $A^2$ and the nozzle throat $A^1$ determines the shape and dimension of the inlet curved nozzle plate 1503 (first nozzle), and the outlet curved nozzle plate 1504 (second nozzle) that is removed to connect the inlet mouth 1801 to the nozzle chamber 1802, in turn connecting the flow path from the inlet mouth 1801 to the nozzle throat $A^1$, making the inlet reservoir and the nozzle throat $A^1$ a convergent nozzle when the nozzle insert 1901 is inserted. In this regard, the line between $A^0$ and $A^1$ (y-sector line), and $A^0$ to $A^2$, and $A^2$ to $A^1$ forms the convergent portion of the convergent-divergent nozzle of the embodiment.

The incoming inlet gas 118 flows from the convergent portion or section of the nozzle, described above, through the nozzle throat $A^1$, to a section with a generally divergent profile, the divergent sector 1903 defined between $A^1$ and $B^1$. The divergent sector 1903 is machined into nozzle insert 1901, where $B^1$ defines the divergent outlet width $B^1$ of the convergent-divergent nozzle of the curved nozzle 1704. The divergent outlet width $B^1$ in the embodiment depicted is between about 1.5 to about 4.5 times that of the nozzle throat width $A^1$. Marking the desired width of $B^1$ on the nozzle insert 1901, an increasing forward curved machine cut is made between $A^1$ and $B^1$ along the perimeter of the nozzle insert 1901. With this cut completed, and when the nozzle insert 1901 is fitted into the nozzle chamber 1802, a convergent-divergent nozzle flow path is formed between the inlet mouth 1801, through the nozzle throat 1902, via the nozzle throat width $A^1$, and through the divergent sector 1903 created by machining the $A^1$ to $B^1$ sector of the nozzle insert 1901. The effect of the flow of the incoming inlet gas 118 from the nozzle throat 1902 through the divergent sector 1903 is to create a convergent-divergent nozzle structure within the curved nozzle.

Continuing the machining of the nozzle insert 1901, a cut is made between point $B^1$ and point $D^1$ in a straight-line, and a second cut is made between $D^1$ and $C^1$ in a reverse curve. The skimmer width $C^1$ is formed from the perimeter of nozzle insert 1901, and the dimension of the skimmer width $C^1$ determines the width of $D^1$ from its perimeter on the x vector line. The gas skimmer 1906 is located along a continuous line drawn along the outer wall of the nozzle chamber 1802 from the exit of the divergent sector 1903 at B to C. Skimmer width $C^1$ in the embodiment depicted is about 1 to about 3 times the width of the nozzle throat width $A^1$. With the described cuts made, the material removed from the nozzle insert 1901 causes the inlet gas 118 emerging from the convergent-divergent nozzle at the divergent outlet width $B^1$ forms a stagnation zone 1904 in the nozzle chamber 1802 upon exit. With the nozzle insert 1901 fitted in the nozzle chamber 1802 it can be seen that a relatively large chamber, with a straight-wall along the x-sector line and a reversed curved wall between $D^1$ and $C^1$ is formed, and that the divergent outlet width $B^1$ empties into the stagnation zone bordered by the curved perimeter of the nozzle chamber 1802.

The next cut to the nozzle insert 1901 is similar to the nozzle throat $A^1$ cut made previously, to form the and this is for the skimmer width $C^1$. One side of the skimmer width $C^1$ is already cut by the reversed curve cut along $D^1$ and the skimmer width $C^1$. The final cut to form the boundaries of the skimmer width $C^1$ is made by extending the curved line $C^2$ to the point of the skimmer width $C^1$ intersecting the nozzle insert 1901 and removing material from the nozzle insert 1901 along that curvature and the material between the light depleted diffuser 1803 and the nozzle chamber 1802 to form the overall light depleted diffuser 1803 shape.

The final cut to the nozzle insert 1901 and the nozzle chamber 1802, is to form the light enriched diffuser 1805. The light enriched outlet port 1905 from the nozzle chamber 1802 and the nozzle insert 1901 is made by creating a notch-cut on the top and bottom of both the nozzle chamber 1802 and nozzle insert 1901 along the x-line at $D^1$ and at a distance parallel from $D^1$ along the curvature from $D^1$ to $C^1$ at point $D^2$. The distance between $D^1$ to $D^2$ is variable in a range of from about 1 degree to about 20 degrees, dependent on the volume of inlet gas 118 passing through the curved nozzle 1704, and the pressure needed to sustain the pressure $P^{noz}$ in the stagnation zone 1904 in a range of from about 0.15 to about 0.25 when relative to the pressure in the inlet reservoir 1701 $P^0$, (i.e. maintaining the ratio of $P^1/P^0 = \sim 0.15$ to $\sim 0.25$). The depth of the light enriched outlet port 1905 is selected in the embodiment shown to be about 0.5 to about 5 mm. The light enriched outlet port 1905 leads radially-in to a light enriched outlet channel continuing into and through the central hub 123, for outlet of the light enriched or heavy depleted fraction also described herein as the light specie enriched fraction 122.

As depicted in FIG. 20, the centrifuge nozzle separator 1500 has the ability to stack centrifuge rotor systems 1505 in order to concentrate the heavy fraction, or light specie depleted fraction 120 into a larger concentration in a smaller volume. This arrangement is accomplished by having an upper nozzle plate 1503 that receives the inlet gas 118 coming from the central hub 123 and filling the inlet reservoir 1701, and having that inlet gas 118 expand through the curved nozzle 1704, where the flow is fractioned into the heavy depleted gas or light specie enriched fraction 122 and a heavy or light specie depleted fraction 120. In this process, the heavy depleted fraction or light specie enriched fraction 122 is passed through the gas port 2001 of the inlet curved nozzle plate 1503 and into the light fraction reservoir 1705 that is fabricated inside the manifold plate 1606, while the heavy fraction or light specie depleted fraction 120 outlets to the heavy fraction reservoir 1703. In the embodiment depicted in FIG. 20, the gas port 2001 is located within the nozzle chamber 1802. The light specie enriched fraction 122 that is in the light fraction reservoir 1705, further expands through the periphery outlet port 2005 in the manifold plate 1606 and to enter a periphery space in the centrifuge rotor system 1505. The heavy fraction, or light specie depleted fraction 120 in the heavy fraction reservoir 1703 passes through the plate gas port 2006 in the inlet curved nozzle plate 1503 and through manifold plate 1602, to fill the inlet reservoir 1701 of the outlet curved nozzle plate 1504, for a second gas processing step using a second set of curved nozzles 1704 located in the outlet curved nozzle plate 1504.

In other embodiments, multiple nozzle plates 1503, 1504 are stacked in a tapering volume cascade, such that the total volume of each succeeding intermediate curved nozzle plate (not shown) are reduced according to the separation cut of the prior curved nozzle plate.

Inlet Pre-Conditioner

Figure 21:
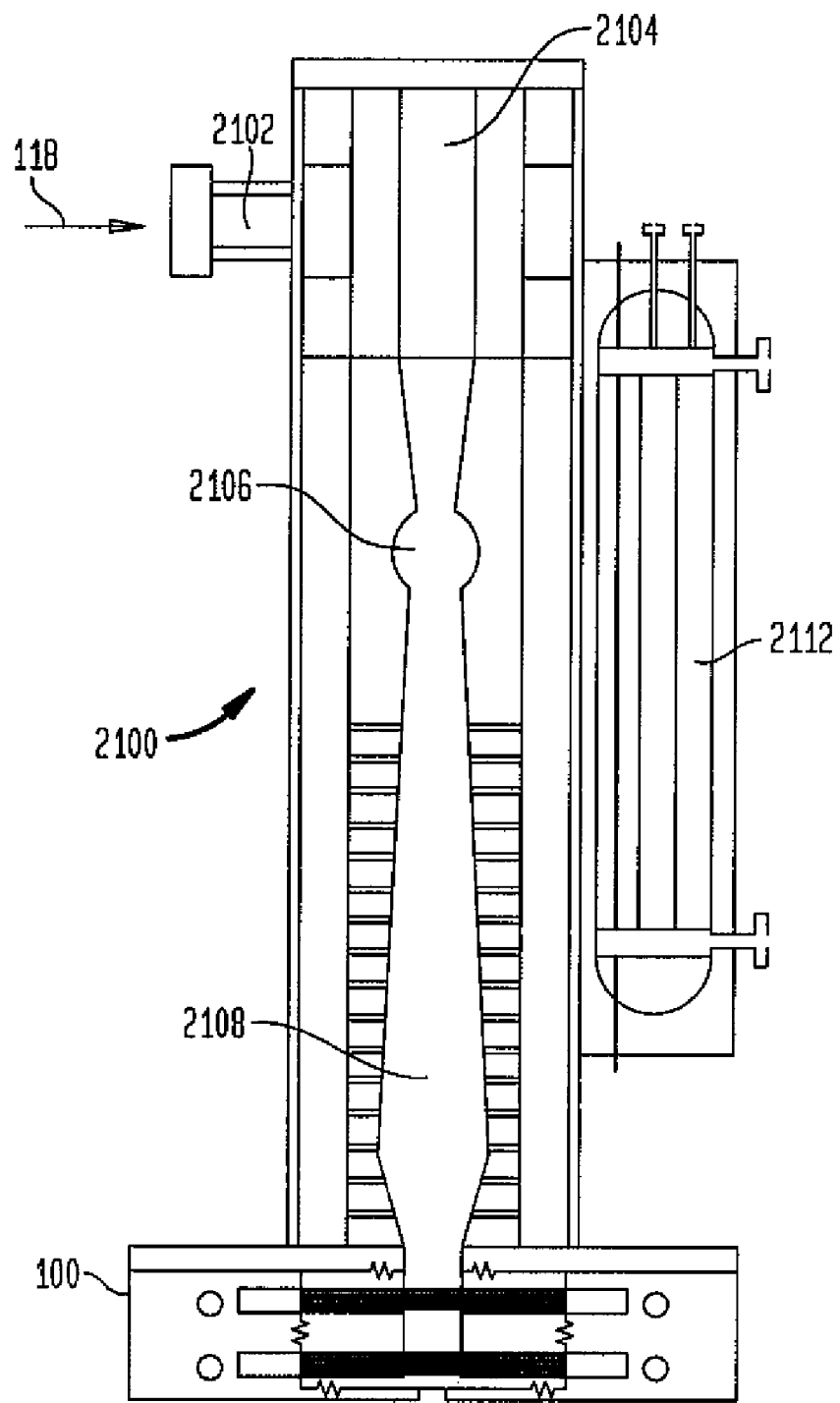
FIG. 21 is planar view of an overall gas centrifuge device assembly with an inlet and centrifuge elements.

FIG. 21 illustrates another embodiment of a separation device, in which a centrifuge rotor 100 is fluidically coupled to an inlet pre-conditioner 2100. The inlet pre-conditioner 2100 has in inlet channel 2102 and a dynamic swirl chamber 2104 for swirl generation of a pressurized fluid inlet flowing into a separation or pre-expansion sector of the inlet pre-conditioner 2100, referred to herein as an inlet nucleation segment or a "nozzle sector" 2106. The nozzle sector 2106 is arranged as a sonic-transonic-sonic aerodynamic flow component that accelerates the pressurized and swirling flow in a full isentropic expansion through a channel 2108. The design of the channel 2108 allows a controlled expansion of the swirling fluid flow where saturation of condensed specie concentrates at the periphery of the channel 2108, and vapor/gas fractions diffuse to the core region of the channel 2108, due to the supersonic expansion created by the nozzle sector 2106 and by temperature controls used in the channel 2108, leading to the centrifuge rotor 100.

FIG. 22 shows the inlet channel 2102, dynamic swirl chamber 2104, and nozzle sector 2106. Inlet channel 2102 controls the pre-process volume allowable for fluid processing flow. Dynamic swirl chamber 2104 in one embodiment, consists of a rotatable hollow body chamber that is supported by a radial support and by gaseous pressure, and the hollow body receives the inlet flow through a tangent flow, and in its operation, the dynamic swirl chamber 2104 imparts a strong swirl flow pattern to the inlet flow from inlet channel 2102. In other embodiments, the dynamic swirl chamber employs other means for imparting a swirl to the inlet gas 118 such as a rotary turbine or fixed blades that deflect a portion of the flow in a centrifugal direction.

The dynamic swirl chamber 2104 imparts a rotational moment to the fluid progressing into the nozzle sector 2106, through the convergent inlet section 2201, and as the swirl flow pattern progresses through the first throat 2204 the swirl flow gains acceleration from the pressure characteristic of the flow, and then is rapidly expanded in the expansion throat 2205 and quickly is recompressed before entering the second throat 2206. In this method of flow processing, pressure is reduced entering the expansion throat 2205, allowing for a partial fluid condensing effect where a degree of heat is transferred and removed from the expansion throat by a working fluid circulating from a variable cooling exchanger 2112 (see FIG. 21). During the recompression of the fluid in the expansion throat 2205, a degree of elevated pressure is gained and causes a pressure pulse to occur in the swirling fluid entering the second throat 2206. Passing through the second throat 2206, the swirling fluid is expanded in the divergent channel 2203 of the nozzle sector 2106, causing the initial condensing specie of the flow created in the expansion throat 2205 to saturate from the axial core of the divergent channel 2203 toward the periphery core of the divergent channel due to density difference and the pulse produced swirl of the fluid. As used herein, the divergent channel 2203 and the second throat 2206 form a convergent-divergent nozzle segment that is coupled to the inlet nucleation segment or nozzle section 2206. In one embodiment, the periphery of the divergent channel 2203 and the nozzle section 2206, or inlet nucleation segment, consists at least in part of a collection wall adapted to collect the nucleated species. In a second embodiment, the divergent channel 2203 consists at least in part of a collection wall adapted to collect the nucleated species.

Fluid swirl flow around the centerline of the inlet pre-conditioner 2100 is imparted by the dynamic swirl chamber 2104. As the flow enters the first throat 2204, the pressure of the fluid before the throat translates into a rotational velocity component at the first throat 2204. Passing through the first throat 2204 diameter, the fluid flow is rapidly expanded into the expansion throat 2205. The rapid expansion induces nucleation or condensation of a portion of the fluid where specie within the fluid content may nucleate. As part of the condensation process, heat is released from the fluid causing heating of the expansion throat 2205 wall. In one embodiment the heat transfer from the wall of the expansion throat is dissipated via conduction to the remainder of the inlet pre-conditioner 2100 and radiation and convention to the environment surrounding the inlet pre-conditioner 2100. In another embodiment, as depicted in FIG. 21, the heat exchanges, or more precisely a cooling exchanger 2112 is used to dissipate the heat from the inlet pre-conditioner 2100.

As the fluid passes through the expansion throat 2205 maximum diameter, it begins to recompress due to reducing diameter of the expansion throat 2205, elevating pressure into the time interval of a pressure pulse before the fluid passes through the second throat 2206. Second throat 2206 is of a greater diameter when compared to first throat 2204, and fluid passing through the first throat 2204 rapidly expands into the expansion throat 2105 of the nozzle sector 2106. Nucleation of fluid specie from the inlet gas 118 passing through the expansion throat 2205 begins adding content from remainder of the fluid, and due to the rotation or swirl of the fluid body previously initiated, centrifugates toward the periphery wall, beginning to form a density periphery core concentration about the edges of the periphery wall of the channel 2108. Ultimately the inlet gas 118 passes down the channel 2108 and enters the rotor 2310, where centrifugation completes the separation process already initiated in the form of the nucleation described above.

The inlet pre-conditioner 2100 in the embodiment depicted in FIG. 21 combines a three concepts to pre-condition the inlet gas 118 prior to entering the centrifuge rotor 100 for final separation into heavy and light specie gas, the light specie depleted fraction 120 and the heavy depleted light specie enriched fraction 122 respectively. The first concept is the use of a swirl imparting means for imparting a centrifugal acceleration or rotational swirl 2250 (shown in FIG. 22) to the inlet gas 118 around the centerline of the inlet pre-conditioner 2100. The rotational swirl 2250 is adapted to rotate the inlet gas 118 toward the edges of the inlet pre-conditioner 2100 thus imparting an acceleration field upon the inlet gas 118. The acceleration field has a tendency to encourage the heavier species to migrate toward the periphery or walls of the inlet pre-conditioner 2100. This migration is enhanced by the separation or expansion throat 2205. The expansion throat 2205 enhances the centrifugal acceleration first by reducing the overall diameter of the inlet passage—thus increasing the rotational swirl 2250 upon passing through the first nozzle throat 2204. Within the expansion throat 2205, the reduction in pressure encourages the formation of condensate in the inlet gas 118. This initial condensation creates nucleation points in the inlet gas 118 passing through the inlet pre-conditioner 2100 that further enhance condensation from the inlet gas 118. The resulting nucleates are further encouraged to fall towards the periphery of the inlet pre-conditioner 2100 walls by the rotational swirl 2250. The final channel 2108 further collects and gathers the resulting nucleates from the inlet gas 118 thereby reducing a portion of the species to be removed from the inlet gas 118 prior to entry into the centrifuge rotor 100.

Method of Operation of Centrifuge Rotor

As previously described, the centrifuge rotor 100 receives inlet gas 118 from a pipe supply or the inlet pre-conditioner 2100. In one embodiment, the pressure and volume of the inlet gas 118 is high enough to provide the motive force for operating the centrifuge rotor 100. In one embodiment of the present centrifuge rotor 100 depicted in FIG. 1 and adapted for use separating natural gas constituents, the gas drive 1017 operates in a dynamic range between about 2000 to about 5000 rev/min. As previously described, the gas drive 1017 is eccentrically housed within the drive stator 1002, so that an irregular annulus exists between the drive 1017 and the stator 1002, and the vanes 1102 of the gas drive 1017 adjust within the stator 1002 to maintain sliding contact with the stator wall. In the embodiment depicted, the gas drive 1017 is rotatably coupled via the rotor shaft 102 to the centrifuge rotor disk 108 and the gas pump 1018 such that all three elements turn at the same rotational velocity. In alternative embodiments the rotor shaft 102 is replaced with a geared shaft as known to those of ordinary skill in the art of rotational machinery, such that different gear ratios are used in some cases accelerate the rotation or decelerate the rotation, but increase the effective torque applied to the centrifuge rotor disk or decelerate the rotation, but increase the effective torque applied to the centrifuge rotor disk 108 and or the gas pump 1018.

In this manner, the inlet gas 118 is contained between vane spacing through the rotation within the stator 1002, and the only outlet for the pressurized gas 1201 is through gas ports 1205 that are on the top of the drive impeller 1006. As the pressurized gas 1201 is through gas ports 1205 during the rotation, and with the drive impeller 1006 attached to the central hub 123, the gas ports 1205 of the drive impeller 1006 exhaust gas into and through the central hub 123 to the centrifuge 108.

In operation the embodiments of the separation device act to separate the inlet gas 118 using both a gas acceleration mode and pressure gradient mode. In the case of embodiment of the centrifuge rotor disk 108, the configured combination of nozzles and skimmers (e.g. the convergent nozzle 702, the apex skimmer 524 forming a skimmer and the v-point 618) converts the heat energy of the inlet gas mixture, which constitutes random molecular motion at elevated pressure with small velocity, into directed flow velocity along specific radial paths from the axis of rotation to the centrifuge wall, preferably at concentrated above-sonic value. During this conversion from pressure to velocity, a choked flow velocity is realized at each nozzle throat 704, where pressure and temperature are reduced through expansion, and the entire gas flow is concentrated into a compact gas beam. Before the nozzle throat 704, the gas mixture is at its largest pressure level, which is referred to as the reservoir pressure $P^0$. Within the nozzle throat 704, typically the narrowest portion of the convergent nozzle 702, the forward gas flow becomes choked velocity flow, where the gas becomes sonic M=1, and the pressure ń of the gas in the nozzle throat 704 reduces to $0.528 \leq P^0$. In this regard, the gas beam is concentrated at and beyond the nozzle throat 704, and the molecular spacing is elongated in the velocity parameter.

The linear embodiment of the centrifuge rotor 100 has three successive rings concentrically spaced from the axis of rotation to the centrifuge wall, and between each successive ring, there is a pre-determined spacing distance, or offset distance, that relates to the radial flow path, and the offset has an expansion area on either side of the radial flow path. In each expansion or stagnation zone, gas pressure $P^1$ is maintained at 0.15-0.25 of $P^0$. In this relationship along the radial flow path, the gas mixture in the gas beam is about 0.528 of $P^0$, and the gas beam pressure is greater than the stagnation zone pressure $P^1$. In this regard, the designed function of the linear embodiment is to concentrate and accelerate the gas flow in a compact gas beam that has expansion zones on either side of its radial flow path extending from the axis of rotation of the centrifuge to the centrifuge wall.

Coinciding with the operation of the nozzle expansion and skimmer function of concentration and flow fraction separation is the influence that the centrifuge generated pressure-force has upon the gas beam flowing in a radial direction from the axis of rotation of the centrifuge to the centrifuge wall. It is known in the art of centrifugation that a relative centrifugal force is realized within a centrifuge along the radial direction extending from the axis of rotation to the centrifuge wall, and a simple expression can be given as to the degree of pressure that the centrifuge generates compared to gravity:

$$RCF = 1.12 \text{ radius(mm)} (RPM/1000)^2$$

Beginning at the axis of rotation of the centrifuge, 1×gravity, the gravity pressure increases exponentially to the periphery wall, so that along the radial flow path centerlines gravity pressure increases independently of the gas flow velocity. In an example centrifuge, with the nozzle/skimmer/skimmer arrangement placed 150 mm from the axis of rotation (and the gas inlet from the central hub 123), and with the centrifuge rotating at 4000 rpm, the centrifuge is generating about 2600 times gravity pressure on each centerline flow path within the zone of flow velocity.

Another component arranged on the radial flow paths within the centrifuge is the generated shock-fronts that are evident before each critical throat opening in the first and second gas skimmer assemblies. These shock zones are parabolic in shape about the skimmer geometry, and are the result of back-facing pressure from the centrifuge wall extending from the centrifuge wall toward the axis of rotation of the centrifuge. As the accelerated flow of the gas beam approaches each skimmer, it collides with this pressure zone constituting the shock front, and the sonic velocity of the gas beam is reduced below the sonic value. Flow diffusion occurs perpendicular to the radial line, where molecules that have adequate inertial velocity penetrate the shock front and enter the critical throat, while those molecules that have lost enough aerodynamic velocity tend to diffuse perpendicularly and form streamlines around the skimmer contours. FIG. 21 illustrates the contours of static pressure generated along a radial flow path portrayed in a computerized flow dynamic model. Ca constitutes the radial centerline beginning at the axis of rotation, Cp is the radial centerline ending at the centrifuge wall, N is the convergent nozzle 702, B is a v-point 618 of the first skimmer ring 214, and D is an apex skimmer 524 of the second skimmer ring 216. It can be seen that pressure levels build along the radial flow path and that the shock fronts SF establish before each critical throat and extend around the angled contours of the skimmers 214, 216, with the expansion zones E being on either side of the radial flow path Ca-Cp.

The linear embodiment of the centrifuge rotor 100 has been specifically developed to separate gas mixtures that have a particle concentration that is typically classified as particulate matter PM being of aerodynamic size 2.5 μm and smaller, PM 2.5, which typically are considered a contaminant in air. Typically gas mixtures of this sort are the result of combustion sources, and can become elevated in air in urban areas and in work areas where construction, agriculture, or mining operations occur. This linear embodiment of the centrifuge rotor 100 is intended for development for use at the source of generation, and the PM 2.5 particle will include a carbon core with organic compounds, sulfates, nitrogen oxides, heavy metals, and irritants adsorbed to the surface of the core, with the particles suspended in a gaseous fraction which may contain nitrogen, oxygen, carbon dioxide, water vapor, and aldehydes. Overall, when released to the atmosphere, fine particles like PM 2.5 can be readily inhaled by humans and animals, and can be deposited deeply in the lung where potential health risk can occur including respiratory illness, allergic response, and possible carcinogenic effect.

The separation effect of the linear embodiment of the centrifuge rotor 100 for a gas mixture having PM 2.5 particles magnifies the separation of these aerodynamic shaped particles by increasing the overall velocity of the gas mixture along a radial pressure zone and having an abrupt deceleration through successive shock fronts SF. In this action, the particles are slowed down due to their surface reaction to the deceleration and diffuse perpendicular to the radial flow line toward lower pressure zones E. This separation appears as a deflection where the particles are entrained in a small gas fraction, and this separated gas/concentrated particle fraction enters the lower pressure expansion zones E and is subsequently extracted from the centrifuge rotor 100 through the central hub 123. In this separation, the object is to separate 0.90 of the PM 2.5 particles contained in a gaseous fraction that is 20-30% of the overall gas mixture volume, sending this overall separated fraction for containment in a vessel or filter matrix for disposal.

The curved nozzle embodiment of the centrifuge nozzle separator 1500 is to be used for gas mixture separation where either a two-component gas mixture is separated into a light enriched gas fraction referred as the heavy depleted gas or light specie enriched fraction 122 and a light specie depleted fraction 120, or is used for gas mixtures that contain a condensable gas component and the condensable gas is condensed and concentrated in one fraction, and a condensable gas depleted fraction is separated by the centrifuge.

In this embodiment, the curved nozzle component for the centrifuge nozzle separator 1500 is designed to concentrate a heavy component from a process gas mixture, and then separate the heavy depleted fraction or light specie enriched fraction 122 of the flow from the process gas flow. For the method to separate a process gas to work efficiently, it is necessary to generate a process gas flow field that becomes supersonic in value and is contained between boundaries for the perpendicular forces to act on the flow field. In this method, the concentration by diffusion of the heavy component to the centrifuge wall and light component to the axis of rotation is caused by accelerating the process gas through a bending flow field that develops a radial pressure gradient during a small time period. Using this method, as the process gas passes through the generated centrifugal force over a short time period, equilibrium of the gas components cannot be attained before the extraction of two gas fractions occur.

The characteristic of the process gas flow field that exists in a convergent-divergent nozzle such as curved nozzle 1704 can be characterized as to flow changes as back-pressure $P^3$ is decreased while the upstream pressure $P^0$ is maintained. When $P^3$ is the same as $P^0$, the flow remains subsonic and the mass flow rate increases with decreasing $P^3/P^0$ pressure ratio. When the downstream pressure is decreased to a critical level, the mass flow rate is unaffected by changes in $P^3$, and the gas flow velocity increases. At a critical value of $\leq 0.528$ of $P^0$ is attained at the nozzle throat 1902, the flow is considered choked and a velocity of Mach 1 is reached at the nozzle throat 1902. As the back-pressure is reduced below a critical value, a zone of supersonic flow develops downstream of the nozzle throat 1902. In the convergent-divergent nozzle of this invention, the zone of supersonic flow is terminated by a shock front, where pressure increases and flow velocity decreases to a subsonic velocity. As the back-pressure is further reduced $P^3$, the supersonic flow zone increase in length and the shock wave moves further downstream from the nozzle throat 1902 in the divergent section of the overall nozzle 1704, and with that, it is possible to move the shock front outside of the convergent-divergent nozzle outlet.

In the current embodiment of the centrifuge nozzle separator 1500, it was determined to design the individual nozzle system as a three-level or three-stage tapering cascade. Beginning with the initial inlet of process gas into the first stage, gas flow passes through the first stage curved nozzle 1704 at a maximum volume determined by the height of the nozzle passage. Upon outlet of the first stage curved nozzle 1704, the heavy component fraction of the original flow is passed to the second stage curved nozzle 1704 inlet directly underneath the first stage curved nozzle 1704 system, and that gas flow passes through the second stage curved nozzle 1704 from inlet to outlet. The second stage curved nozzle 1704 height is smaller when compared to the first stage curved nozzle 1704 height, thereby reducing the overall volume of the second stage nozzle. At the outlet of the second stage curved nozzle 1704, the heavy component outlet of the curved nozzle 1704 is passed to the third level directly beneath the first stage curved nozzle 1704 and the second stage curved nozzle 1704, to the third stage curved nozzle 1704 system. Once again, the height of the third stage curved nozzle 1704 is smaller than the height of the second stage curved nozzle 1704, thereby reducing the third stage curved nozzle 1704 available volume. In this method of design, the stacking of three curved nozzles 1704 in a continuously reducing volume allows for the heavy component of the original gas mixture to be consecutively separated and concentrated by three successive gas flow passes. Any number of levels or stages can be designed into the centrifuge nozzle separator 1500, qualified by the available initial pressure $P^0$ of the process gas mixture at the original inlet of gas into the centrifuge rotor system 1505. The benefit of this method of operation is to allow for consecutive minimum separation efficiencies to happen, thereby improving the overall efficiency of the centrifuge separation effect by conservation of energy in the separation process.

Each nozzle stage in the centrifuge nozzle separator 1500 is designed to be identical to the other stages in the nozzle assembly. In this design, each nozzle stage allows for the original gas mixture to enter the nozzle system at its largest pressure and at minimum velocity. Each nozzle stage is built with an inlet reservoir 1701 at pressure $P^0$, a heavy fraction reservoir $P^2$, and a light fraction reservoir 1705 at pressure $P^1$. The original gas mixture from the central hub 123 inlets to the inlet reservoir 1701 at its pressure value $P^0$ and due to the reservoir size is at a minimum velocity. The inlet reservoir 1701 is parallel to and upstream of the nozzle inlet mouth 1801. As the process gas passes through the curved nozzle 1704, it is fractioned by the skimmer 1906 into the stagnation zone and into the skimmer outlet. Parallel and downstream of the skimmer 1906 is the heavy fraction reservoir 1703 which is maintained at a pressure level $P^2$ and reduces the skimmer fraction velocity to a minimum due to its size and volume. The skimmer deflected flow enters the stagnation zone and outlets to the light fraction reservoir 1705 where the light fraction flow is maintained at its pressure level $P^1$ and is reduced in flow velocity, also a result of its size and volume. The light fraction reservoir 1705 is directly beneath and parallel to the stagnation zone, and is fabricated in the separation plate that separates the different nozzle stages. In all, these reservoirs are of large volume compared to the nozzle and remain at constant pressures the inlet reservoir 1701 at pressure $P^0$, the heavy fraction reservoir 1703 at pressure $P^2$, and the light fraction reservoir 1705 at pressure $P^1$.

In the nozzle flows, the flow effects due to viscosity and heat transport develop at the boundary walls in thin layers, and become the boundary wall surface layers, with the flow field within the boundary layers being adiabatic with minor dissipative factors. In the curved nozzle 1704, there is a relationship between the nozzle throat/nozzle outlet dimension ratio, or the expansion ratio, that determines the Mach velocity at the outlet of the nozzle 1704, where:

$$D^2/D^1 = 1/M\{(2/y+1)[1+(y-1/2)M^2]\}y+1/2(y+1)$$

when $D^1$ and $D^2$ are the throat dimension and the nozzle outlet dimension, and y is the specific heat ratio of the process gas. This equation is considered the Mach Velocity Equation. With this equation, there is a relating equation for pressure across the nozzle inlet to the nozzle outlet:

$$P^0/P^2 = (1+y-\tfrac{1}{2}M^2)y/y-1$$

when $P^0$ is the inlet reservoir pressure and $P^2$ the skimmer reservoir pressure. Through this relationship, this design for the centrifuge curved nozzle has yielded an expansion ratio range of from 1.70-4.50 for a Mach velocity range of from 1.8-3.0 Mach.

The nozzle characteristic that is desired in the centrifuge 1500 is to reach a Mach velocity at the nozzle throat M=1, through the action of the convergent section of the nozzle which is compressing and accelerating the sub-sonic gas from the inlet reservoir 1701 to a choked throat condition of $\leq 0.528$ of $P^0$. Following the nozzle throat 1902, the divergent section of the nozzle accelerates the flow field to supersonic velocity before the back-pressure $P^3$ creates a shock front that returns the flow to subsonic velocity. It has been determined in this design that if the inlet/outlet pressure ratio of the nozzle 1704 exceeds 7.0, then the shock front will be positioned downstream of the nozzle outlet near the skimmer position, and that the entire divergent section of the nozzle and beyond will contain the supersonic zone. It is characteristic then that adjustments can be made to be below this pressure ratio critical level so that the shock front is at or slightly inside of the nozzle outlet.

The important features within the centrifuge nozzle that determines the separation effect and the pressure distribution are the nozzle expansion at the nozzle throat, the shock front generated by the back-pressure $P^3$, and the area and shape of the large pressure gradient generated along the centrifuge wall. The sector of the expansion is determined by the nozzle geometry. The pressure gradient sector and where that sector removes from the centrifuge wall directly effects the separation efficiency. The shock front location determines to what length of time the separation effect is at its maximum before outlet.

The distribution of mach velocity shows that a higher mass flow rate is exhibited through the heavy component streamline. In this, the nozzle geometry does cause a shape to the velocity profile that is responsible for separation through the opposing effects of the bending of the accelerating flow, which normally would indicate a higher velocity of flow at the outer centrifuge wall, and the higher molecular weight at the centrifuge wall, which would normally result in a lower velocity. This conflict, seen in a static device such as the Becker separation nozzle, is remedied in the centrifuge curved nozzle by the addition of the extra force generated by the rotation of the centrifuge. Whereas in the static arrangement of the nozzle, the initial large velocity begins at the inner wall downstream of the nozzle throat, and then crosses over to the deflection wall and then removes from the deflection wall. The centrifuge version has the initial large velocity beginning at the inner wall downstream of the nozzle throat, and then crosses over to the centrifuge wall where the additional centrifugal force of the centrifuge concentrates heavy component due to drag forces and the light component associated with the heavy component at the centrifuge wall separates from that streamline, maintaining the higher velocity level closer to the centerline of the bending accelerated flow.

In this method of operation, the denser specie of the process gas is pressure driven to locations of the largest pressure by centripetal acceleration and pressure diffusion. This can be seen by combining a centripetal acceleration equation and a force equation:

$$Ac = v^2/r \text{ (meter), and } Fc = mAc, \text{ to arrive at;}$$

$$Fc = mv^2/r \text{ (meter)}$$

when v is the velocity of flow, r is the radius of curvature in meters, m is the molar mass average of the process gas. These areas of larger pressure relate to the turning of the flow and the outer wall at each flow bend. This corresponds to the initial turn of the flow directly downstream of the nozzle throat on the inner boundary wall of the nozzle, and the centrifuge wall of the nozzle that is formed as a reverse curve, and again past the skimmer throat in the heavy fraction outlet. In the initial turn past the nozzle throat, the heavy fraction of the flow is concentrated on the inner wall of the divergent sector and subsequently concentrates from the inner wall of the divergent sector to the outer centrifuge wall to finally concentrate along the centrifuge wall. This diffusive transfer broadens the expansion region within the divergent sector of the nozzle, and in this diffusion, the heavy fraction moves steadily to the centrifuge wall while the light fraction component is pushed to the centerline of the nozzle flow. The secondary effect of the added centrifuge generated force due to rotation allows the heavy fraction to diffuse to the outer wall earlier when compared to the static device, leading to an improved separation.

As mentioned earlier, at low pressure ratio, the location of the shock is within the divergent sector of the nozzle, close to the nozzle expansion. If the pressure ratio is increased, which is defined as the pressure maintained being decreased in the stagnation zone $P^1$, the shock front moves downstream in the divergent section of the nozzle. This is a cause and effect for separation, where the effect is that the degree of the pressure gradient increases as the pressure ratio increases. The larger pressure gradient provides a higher pressure diffusion flux, increasing the separation factor through temperature and pressure decrease. At a device pressure ratio, inlet before the nozzle and outlet after the nozzle, of about 2.0, the desired peak combination of high pressure gradient and heavy fraction streamline position within the skimmer throat dimension is realized. This corresponds with the assumption that at locations of higher pressure, either caused by the shock front or by the combined centripetal acceleration force/centrifuge force, there is a higher degree of heavy fraction concentration, and thereby a lower concentration of the light fraction. As the nozzle pressure ratio increases, the pressure distribution profile changes; as the increase in pressure ratio causes a greater pressure gradient to form across the flow near the centrifuge wall, pressure diffusion increases and thus increases the diffusive flux of light and heavy fractions according to the streamlines, resulting in increased separation. As the pressure ratio of the nozzle increases similarly, the mean average flow velocity through the device increases, causing higher centrifugal force and lower residence time of process through each stage.

The previous description of separation in the centrifuge nozzle separator 1500 describes the separation effect realized in a two-component gas/gas separation. The current invention also allows for the separation effect to occur in a gas mixture with a condensable fraction. In understanding the relationship of gas velocity generation from a pressure source, and the subsequent relationship of the nozzle pressure ratio to the pressure distribution and following shock front position due to the nozzle pressure ratio, it should be also understood that the expansion can effect a condensing factor into the process gas where temperature and pressure drop causes a phase change of a condensable gas specie from the gaseous fraction. As the nozzle pressure ratio is allowed to exceed the critical value, identified earlier as the nozzle pressure ratio of 7, a potential drop of pressure and temperature can bring the phase transition factor into separation effect. In this regard, in a supersonic flow the gas is being adiabatically expanded and the resulting cooling leads to cluster formation by condensation. In this process, the ensuing adiabatic expansion slows down the atoms to a point at which binding between neighboring atoms becomes energetically favorable. The expansion through the nozzle throat leads to a strong alignment of the molecular velocity, largely overcoming the original thermal velocity of the molecules, reducing the temperature, pressure, and density of the gas. When molecules of the condensable fraction become sufficiently cold, they can bind together to form a clusters at finite temperature. The temperature of a core of expansion through a nozzle is given by:

$$T/T^0 = [1 + \tfrac{1}{2}(\gamma - 1)Ma^2]^{-1}$$

where $T^0$ is the reservoir gas temperature before expansion, and the Mach number M increases along the downstream of the expansion. Following this explanation, as the adiabatic expansion of the gas begins at the inlet reservoir with pressure $P^0$ and temperature $T^0$, the gas expands along the isentrope up to where it crosses the vapor pressure curve Pv(T). Pv is the vapor pressure of a plane liquid surface. The further expansion continues to follow the isentrope into a liquid phase region where the condensation phenomena is realized. As the expansion point continues forward, the formation of clusters occurs until the expansion is finally heated by the released condensation energy.

This described action of expansion leading to condensation within this centrifuge device then describes the resulting separation in two facets, where a gas fraction separates from the process gas through change of phase, and as the onset of condensation occurs due to the expansion, the generating phase molecules subsequently begin the diffusive heavy fraction flux toward the centrifuge wall. In the course of this type of separation, the nozzle component can be enlarged to provide a longer flow path for the expansion onset to condensation effect to evolve, and the nozzle pressure ratio is increased above the critical value of 7.0, and the expansion ratio of the nozzle is increased to approximately 4-4.5, resulting in a higher Mach velocity of about 3.0.

INDUSTRIAL APPLICABILITY

The present separation device and method disclosed herein possesses a number of unique attributes and industrial applicability for the separation of various gas species and aerosolized particle species as further detailed herein.

Isotropic Gas Separation for Semiconductor Fabrication

Silane ($SiH_4$) is a pyrophoric chemical compound that decomposes into silicon and hydrogen. The decomposition process makes Silane particularly useful for the chemical vapor deposition (CVD) of silicon on substrates. For microelectronics, the use of CVD to deposit fine epitaxial layers of high purity silicon is critical for the fabrication of high performance semi-conductor microelectronics. Silicon is naturally found in three primary stable isotopes, Si-28 (about 92.2%), Si-29 (about 4.7%) and Si-30 (about 3.1%). An example of an alternative to Silane as a gas to be treated for manufacturing isotopically enhanced wafers includes silicon tetrafluoride. Recent research has demonstrated that deposition of isotopically-enriched or a nearly isotopically-pure silicon epitaxial layer enables higher performance, and greater stability micro-electronics. This same research indicates an even greater performance advantage when isotopically pure solid, single crystal wafers are used to produce microelectronic devices. The beneficial properties of both of these isotopically enhanced approaches, include improved carrier mobility and improved thermal conductivity that makes these improved wafer products useful for a variety of different applications.

In additional to silicon, other isotopically-enriched materials suitable for use in semiconductor fabrication include:
Germanium (Ge)
Germanium-Silicide (Ge—Si)
Gallium-Arsnide (GaAs)

Other combinations and single elements as known to those of ordinary skill in the art of semiconductor fabrication show unique properties when isotopically-enriched materials are deposited to form the substrate structures.

Separation of Undesired Species

In another application, the present device and method is employable as a system to remove undesired gas or aerosolized species to purify a gas stream. In one exemplary application, the present device and method is employed to remove water and other undesired constituents from a natural gas stream. Drying and purifying natural gas collected from a wellhead is an important first step prior to transport, storage and use of the natural gas. The present device and method would use the combination of the separation zone to initially condense water vapor from the incoming steam thereby enhancing separation efficiency, followed by the use of the centrifugal separator to isolate and strip away the remaining $H_2O$ from the pure natural gas. In secondary steps, the present device and method is employed to remove other undesired particles from the stream, including, for example, heavier hydrocarbons, carbon dioxide, nitrogen, and hydrogen sulfide.

Structure Adaptation to Specific Gas Species

The structure of the device is adapted to the characteristics the gas, and more specifically the separation gas, and in some circumstances the separation and balance gases in specific proportions to each other. This prevents the use of a separation system, such as a first embodiment of a separation loop 500, from achieving comparable separation efficient (if at all) without relying upon the designed separation gas, and if applicable the same desired balance gas.

Particle Separation

The present device and method is also readily adapted by those of ordinary skill in the art to the separation of aerosolized particles from a gas stream. In one exemplary application, a stream of carbon nano-scale particles is separated from a carrier gas and sorted. A carbon nanotube is a single atom thick sheet of carbon atoms that is rolled into a cylindrical structure with a nano-scale diameter. There are a number of applications where the use of similar size nanotubes (i.e. a preponderance of the nanotubes have a preferred minimum or acceptable window of length and diameter) are of particular import, including, for example, the fabrication of field-effect transistors, optoelectronic devices, chemical sensors, and conductive elements for integrated circuits. The present device and method is readily adapted to the separation of aerosolized particles from an incoming gas stream. In this application, the gas stream entering the device is carrying aerosolized carbon nanotubes. As the gas stream enters the device, the separation process is used sequentially to sort the nanotubes by mass in order to collect the desired type of nanotubes for use. As apparent to those of ordinary skill in the art, the present device and method is readily adaptable to the separation, selection, and sorting of various aerosolized particles from gas streams.

Concentration

The present device and method can also be readily adapted by those skilled in the art to concentrate atmosphere, for example to enhance and lower the detection limits of devices that monitor air for chemical and biological hazards.

Sorting

The present device and method can also be readily adapted by those skilled in the art to sort materials such as nanotubes, and pharmaceuticals. In these fields of use uniformity of size for use or distribution has significant impact on the efficacy of the end product or application.

CONCLUSION

While various embodiments of the present invention have been described above, it should be understood that they have been presented by the way of example only, and not limitation. It will be understood by those skilled in the art that various changes in form and details may be made therein without departing from the spirit and scope of the invention as defined. Thus, the breadth and scope of the present device and method should not be limited by any of the above-described exemplary embodiments.

I claim:

1. A separation device comprising:

a central hub comprising an inlet gas port, adapted to allow an inlet gas comprising at least two separable particle constituents to enter said central hub;

a first separation rotor comprising a convergent nozzle comprising a nozzle throat, a first skimmer comprising a critical throat adapted to rotate about said central hub and accept said inlet gas with a first separation means said inlet gas into a first mass fraction and a second mass fraction;

a second separation means whereby said second separation means is an apex skimmer comprising a second critical throat adapted to rotate about said central hub and adapted to accept said first mass fraction and separate said first mass fraction into a third mass fraction and a fourth mass fraction;

a first outlet adapted to collect and exhaust said third mass fraction; and, a means for rotating the separation device about an axis of rotation of the separation device.

2. A device of claim 1, whereby said first separation rotor, and said second separation means rotate in tandem about said central hub.

3. A device of claim 1, whereby said convergent nozzle, said first skimmer, and said apex skimmer are substantially planar with respect to each other.

4. A device of claim 1, whereby said first separation rotor further comprises:
- an inlet annulus chamber adapted to accept said inlet gas at a first average pressure and fluidicly coupled to said convergent nozzle, whereby said convergent nozzle directs said inlet gas from said inlet annulus chamber toward said first skimmer;
- a chamber interposed between and fluidicly coupled to said convergent nozzle and said first skimmer, wherein said chamber collects said second mass fraction, where said second mass fraction is held at a second average pressure within said chamber;
- a second chamber disposed between said first skimmer and said first outlet diffuser, wherein said second chamber collects said fourth mass fraction, where said fourth mass fraction has a fourth average pressure in said second chamber;
- an outlet diffuser channel adapted to accept said third mass fraction passing through said second critical throat of said apex skimmer, where said third mass fraction of gas has a third average pressure; and,
- whereby said first pressure is greater than said second pressure, said second pressure is greater than said fourth pressure and said fourth pressure is greater than said third pressure.

5. A device of claim 1, whereby said convergent nozzle, said critical throat, and said second critical throat are substantially aligned with each other such that a vector drawn from said convergent nozzle to said critical throat, then to said second critical throat is substantially aligned with a vector drawn from said axis of rotation to said second critical throat.

6. A device of claim 1, whereby said third mass fraction is substantially composed of particles with an average weight greater than an average weight of particles either of said fourth mass fraction and said second mass fraction.

7. A device for separating gas particles comprising:
- a central hub comprising an inlet gas port, adapted to allow an inlet gas comprising at least two separable particle constituents to enter said central hub;
- a first separation rotor adapted to rotate about said central hub and accept said inlet gas with a first separation means said inlet gas into a first mass fraction and a second mass fraction:
- a second separation means adapted to rotate about said central hub and adapted to accept said first mass fraction and separate said first mass fraction into a third mass fraction and a fourth mass fraction;
- a first outlet adapted to collect and exhaust said third mass fraction;
- a means for rotating the separation device about an axis of rotation of the separation device;
- said first separation rotor comprises an inlet reservoir adapted to accept said inlet gas and, wherein said first separation means is a first curved nozzle disposed on said first separation rotor and fluidicly coupled to said inlet reservoir to accept said inlet gas;
- a first gas reservoir adapted to accept said second mass fraction; and,
- wherein said second separation means comprises a second separation rotor, wherein said second separation rotor comprises a second inlet reservoir adapted to accept said first mass fraction from said first separation means and a second curved nozzle disposed on said second separation rotor and fluidicly coupled to said second inlet reservoir to accept said first mass fraction.

8. A device of claim 7, wherein said first curved nozzle comprises a nozzle insert, an inlet mouth, a nozzle throat connected to a divergent outlet via a substantially concave divergent nozzle, and a skimmer throat.

9. A device of claim 8, wherein said inlet mouth is disposed about ninety degrees to said divergent outlet width and the area of said divergent outlet is between about 1.7 times and about 4 times the area of said nozzle throat.

10. A device of claim 9, wherein said divergent outlet is disposed a greater distance away from said axis of rotation than said nozzle throat.

11. A device of claim 7, wherein said first separation rotor comprises a top surface and a bottom surface and said second separation rotor is disposed below said bottom surface of said first separation rotor.

12. A device of claim 7, wherein said means for rotating comprises a rotor shaft rotatably coupled to said first separation rotor, said second separation means, and a torque generator selected from a group comprising: an electric motor, a hydraulic motor, a pneumatic motor, an air turbine, a magnetic motor, a drive shaft connected to an internal combustion engine, an output shaft of a hydrodynamic engine driven by water energy, and an output shaft of a wind turbine.

13. A device of claim 7, further comprising:
- a rotary pump rotatably affixed to said means for rotating and fluidicly coupled to said first outlet to pump said third mass fraction away from said second separation means and eject said third mass fraction away from the separation device.

14. A device of claim 7, wherein said first separation means for and said second separation means each comprise:
- an aerodynamic induced pressure gradient formed by a flow of said inlet gas through said first separation means and a flow of said first mass fraction through said second separation means; and,
- a pressure gradient formed by a centrifugal force applied to said inlet gas and said first mass fraction imparted by a centripetal acceleration a rotation of the separation device about said axis of rotation.

15. A device of claim 7, further comprising:
- a swirl imparting means adapted to accept said inlet gas;
- an inlet convergent nozzle segment fluidicly coupled to said swirl imparting means;
- an inlet nucleation segment fluidicly coupled to said swirl imparting means wherein a fifth mass fraction of said inlet gas partially condenses within said inlet nucleation segment; and,
- an inlet convergent-divergent nozzle segment fluidicly coupled to said inlet nucleation segment and said inlet gas port, wherein said inlet convergent-divergent nozzle segment removes a portion of said fifth mass fraction.

16. A device of claim 15, further comprising a heat removal means adapted to remove heat from said inlet nucleation segment.

17. A separation device of claim 7, wherein, said first separation rotor further comprises a convergent nozzle comprising a nozzle throat, a first skimmer comprising a critical throat and said second separation means, whereby said second separation means is an apex skimmer comprising a second critical throat.

18. A separation device of claim 7, whereby said convergent nozzle, said critical throat, and said second critical throat are substantially aligned with each other such that a vector drawn from said convergent nozzle to said critical throat, then to said second critical throat is substantially aligned with a vector drawn from said axis of rotation to said second critical throat.

19. A separation device of claim 7, wherein said first separation means and said second separation means each comprise:
- an aerodynamic induced pressure gradient formed by a flow of said inlet gas through said first separation means and a flow of said first mass fraction through said second separation means; and,
- a pressure gradient formed by a centrifugal force applied to said inlet gas and said first mass fraction imparted by a centripetal acceleration a rotation of the separation device about said axis of rotation.

20. A separation device of claim 7, further comprising,
- a swirl imparting means adapted to accept said inlet gas;
- an inlet convergent nozzle segment fluidicly coupled to said swirl imparting means;
- an inlet nucleation segment fluidicly coupled to said swirl imparting means wherein a fifth mass fraction of said inlet gas partially condenses within said inlet nucleation segment; and,
- an inlet convergent-divergent nozzle segment fluidicly coupled to said inlet nucleation segment and said inlet gas port, wherein said inlet convergent nozzle segment removes a portion of said fifth mass fraction.

21. A separation device of claim 20, further comprising a heat removal means adapted to remove heat from said inlet nucleation segment.

22. A separation device for separating an inlet gas into a first mass fraction and a second mass fraction, comprising:
- a rotor shaft comprising a first end, a second end, and a centerline, adapted to allow the separation device to rotate about said centerline of said rotor shaft;
- a gas drive rotatably coupled to said rotor shaft in proximity to said first end of said rotor shaft and adapted to accept the inlet gas and output the inlet gas;
- a gas pump rotatably coupled to said rotor shaft in proximity to said second end of said rotor shaft adapted to pump a fluid from a pump inlet and eject said fluid from an outlet port wherein said outlet port passes through and exits from said separation device;
- a central hub with a first portion and a second portion, disposed around said rotor shaft between said gas drive and said gas pump wherein said first portion of said central hub is fluidicly coupled to accept the inlet gas output from said gas drive, and said second portion of said central hub is fluidicly coupled to said gas pump such that said gas pump to pump said fluid from said second portion of said central hub;
- a separation disk rotatably coupled to said central hub and adapted to accept the inlet gas from said central hub;
- a nozzle disposed on said separation disk, whereby said nozzle is adapted to accelerate and eject the inlet gas with a free stream velocity of at least about Mach 1.0;
- a skimmer comprising a skimmer throat, where said skimmer throat is adapted to accept a second mass fraction of the inlet gas ejected by said nozzle; and,
- an expansion zone adapted to accept said first mass fraction of the inlet gas ejected by said nozzle and fluidicly coupled to said pump inlet.

23. A separation device of claim 22, further comprising:
- a rotary swirl generator adapted to impart a swirl to the inlet gas;
- an inlet nozzle throat fluidicly coupled to said rotary swirl generator; and,
- an expansion throat fluidicly coupled to said inlet nozzle throat and said gas drive, whereby a third mass fraction partially condenses from the inlet gas stream in said expansion throat.

24. A separation device of claim 22, further comprising:
- a second nozzle fluidicly coupled to said expansion zone to receive said second mass fraction of the inlet gas, whereby said second nozzle is adapted to accelerate and eject said second mass fraction of inlet gas with a free stream velocity of at least about Mach 1.0;
- a second skimmer comprising a second skimmer throat, where said second skimmer throat is adapted to accept a fourth mass fraction of the inlet gas ejected by said second nozzle; and,
- a second expansion zone adapted to accept a third mass fraction of said first mass fraction of the inlet gas ejected by said second nozzle.

* * * * *